United States Patent
Hu

(10) Patent No.: US 12,519,981 B2
(45) Date of Patent: Jan. 6, 2026

(54) DATA PROCESSING METHOD, APPARATUS, AND DEVICE FOR POINT CLOUD MEDIA, AND MEDIUM

(71) Applicant: Tencent Technology (Shenzhen) Company Limited, Guangdong (CN)

(72) Inventor: Ying Hu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 120 days.

(21) Appl. No.: 18/516,524

(22) Filed: Nov. 21, 2023

(65) Prior Publication Data

US 2024/0089509 A1 Mar. 14, 2024

Related U.S. Application Data

(63) Continuation of application No. PCT/CN2022/135742, filed on Dec. 1, 2022.

(30) Foreign Application Priority Data

Mar. 11, 2022 (CN) .......................... 202210242603.7

(51) Int. Cl.
H04N 19/70 (2014.01)
(52) U.S. Cl.
CPC .................................. H04N 19/70 (2014.11)
(58) Field of Classification Search
CPC ...... H04N 19/70; H04N 19/42; H04N 19/597; H04L 65/60; H04L 65/65; H04L 2212/00
See application file for complete search history.

(56) References Cited

U.S. PATENT DOCUMENTS

| | | | | |
|---|---|---|---|---|
| 12,010,341 | B2 * | 6/2024 | Oh | H04N 19/96 |
| 2013/0318253 | A1 * | 11/2013 | Kordasiewicz | H04L 65/765 |
| | | | | 709/231 |
| 2021/0209812 | A1 * | 7/2021 | Han | H04N 19/1883 |
| 2021/0211734 | A1 * | 7/2021 | Ray | H04N 19/70 |
| 2021/0319581 | A1 * | 10/2021 | Hur | H04N 19/60 |
| 2022/0312035 | A1 * | 9/2022 | Takahashi | H04N 21/85406 |

FOREIGN PATENT DOCUMENTS

| | | | |
|---|---|---|---|
| CN | 113597771 A | 11/2021 | |
| EP | 3745354 A1 * | 12/2020 | ........... H04N 19/184 |
| WO | WO-2020256308 A1 * | 12/2020 | ........... H04N 19/597 |
| WO | WO-2021049333 A1 * | 3/2021 | ........... H04N 19/597 |

OTHER PUBLICATIONS

International Search Report with Written Opinion issued Feb. 24, 2023 in Application No. PCT/CN2022/135742. (20 pages).

* cited by examiner

*Primary Examiner* — Richard A Hansell, Jr.
(74) *Attorney, Agent, or Firm* — ArentFox Schiff LLP

(57) ABSTRACT

In a data processing method for a point cloud media, a media file of the point cloud media is obtained. The media file includes stream data of a plurality of point cloud frames and decoding indication information of each of the plurality of point cloud frames. The decoding indication information of each of the plurality of point cloud frames includes at least two attribute headers. Each of the at least two attribute headers includes attribute identifier information. The point cloud media is processed based on the stream data and the decoding indication information.

17 Claims, 4 Drawing Sheets

DATA PROCESSING METHOD, APPARATUS, AND DEVICE FOR POINT CLOUD MEDIA, AND MEDIUM

RELATED APPLICATIONS

This application is a continuation of International Application No. PCT/CN2022/135742 filed on Dec. 1, 2022, which claims priority to Chinese Patent Application No. 202210242603.7, entitled "DATA PROCESSING METHOD, APPARATUS, AND DEVICE FOR POINT CLOUD MEDIA, AND MEDIUM" and filed on Mar. 11, 2022. The entire disclosures of the prior application are hereby incorporated by reference.

FIELD OF THE TECHNOLOGY

This disclosure relates to the field of computer technologies, and specifically, to a data processing method for a point cloud media, a data processing apparatus for a point cloud media, a data processing device for a point cloud media, and a computer-readable storage medium.

BACKGROUND OF THE DISCLOSURE

With the continuous development of technical technologies, at present, a large amount of point cloud data with high accuracy can be obtained within a short time period at low costs. As large-scale point cloud data accumulates continuously, efficient storage, transmission, publishing, sharing, and standardization of the point cloud data have become hot issues of point cloud application and research.

At present, decoding indication information of a point cloud frame includes an attribute header, and a point cloud attribute slice corresponding to the attribute header includes all attribute data of the point cloud frame. It is found in practice that a decoding indication manner of the point cloud frame is single. As a result, encapsulation and transmission manners of a media file of a point cloud media are also not flexible enough.

SUMMARY

An embodiment of this disclosure provides a data processing method for point cloud media. In the method, a media file of the point cloud media is obtained. The media file includes stream data of a plurality of point cloud frames and decoding indication information of each of the plurality of point cloud frames. The decoding indication information of each of the plurality of point cloud frames includes at least two attribute headers. Each of the at least two attribute headers includes attribute identifier information. The point cloud media is processed based on the stream data and the decoding indication information.

An embodiment of this disclosure provides a data processing method for point cloud media. In the method, a point cloud frame of the point cloud media is received. The point cloud frame is encoded to obtain stream data of the point cloud frame. The decoding indication information of the point cloud frame is generated based on the stream data. The decoding indication information of the point cloud frame includes at least two attribute headers. Each attribute header includes attribute identifier information. The stream data and the decoding indication information are encapsulated in a media file of the point cloud media.

An embodiment of this disclosure provides a data processing apparatus for point cloud media, including processing circuitry. The processing circuitry is configured to obtain a media file of the point cloud media. The media file includes stream data of a plurality of point cloud frames and decoding indication information of each of the plurality of point cloud frames. The decoding indication information of each of the plurality of point cloud frames includes at least two attribute headers. Each of the at least two attribute headers includes attribute identifier information. The processing circuitry is configured to process the point cloud media based on the stream data and the decoding indication information.

An embodiment of this disclosure provides a data processing apparatus for point cloud media, including processing circuitry. The processing circuitry is configured to receive a point cloud frame of the point cloud media. The processing circuitry is configured to encode the point cloud frame to obtain stream data of the point cloud frame. The processing circuitry is configured to generate decoding indication information of the point cloud frame based on the stream data. The decoding indication information of the point cloud frame includes at least two attribute headers. Each attribute header includes attribute identifier information. The processing circuitry is configured to encapsulates the stream data and the decoding indication information in a media file of the point cloud media.

This disclosure provides a computer device, including a processor, configured to load and execute computer-readable instructions. The computer-readable storage medium, storing the computer-readable instructions, where when the computer-readable instructions are executed by the processor, the data processing method for a point cloud media described above is implemented.

This disclosure provides a non-transitory computer-readable storage medium, storing computer-readable instructions, where the computer-readable instructions are suitable for being loaded by a processor to implement the data processing method for a point cloud media described above.

This disclosure provides a computer program product or a computer program. The computer program product or computer program includes computer-readable instructions, and the computer-readable instructions are stored in a computer-readable storage medium. A processor of a computer device reads the computer-readable instructions from the computer-readable storage medium and executes the computer-readable instructions, so that the computer device performs the data processing method for a point cloud media described above.

BRIEF DESCRIPTION OF THE DRAWINGS

To describe the technical solutions of the embodiments of this disclosure more clearly, the accompanying drawings are briefly introduced below. The accompanying drawings in the following description show merely some embodiments of this disclosure, and additional embodiments are within the scope of this disclosure.

DESCRIPTION OF EMBODIMENTS

Figure 1A:
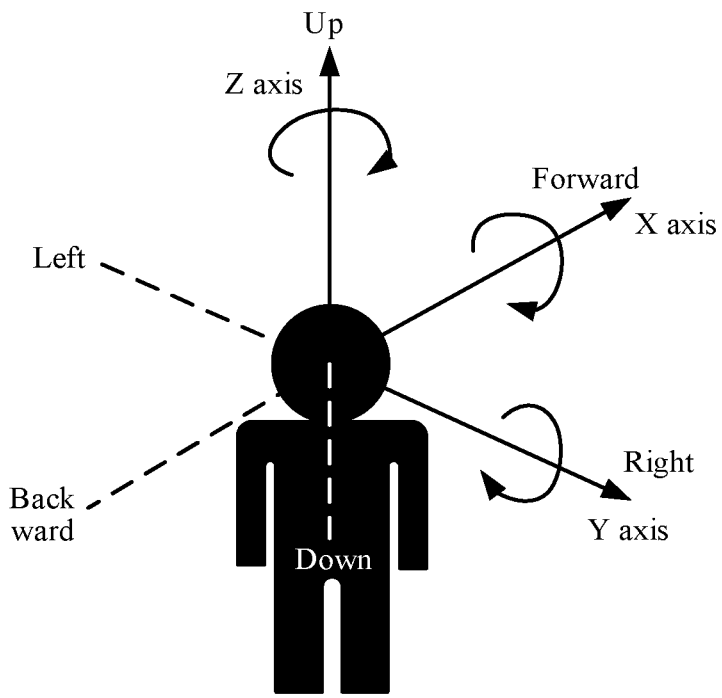
FIG. 1a is a schematic diagram of 6 DoF according to an embodiment of this disclosure.

The technical solutions in the embodiments of this disclosure are described in the following with reference to the accompanying drawings. The described embodiments are merely some embodiments rather than all of the embodiments of this disclosure. Other embodiments shall fall within the scope of this disclosure.

Examples of the technical terms involved in the embodiments of this disclosure are introduced below:

1. Immersive media:

In an example, an immersive media is a media file that can provide immersive media content and allow a viewer immersed in the media content to obtain sensory experience such as visual or auditory experience in a real world. The immersive media may be classified into a 6 degrees of freedom (6 DoF) immersive media, a 3 DoF immersive media, and a 3 DoF+ immersive media based on a degree of freedom when the viewer consumes the media content.

2. Point cloud:

In an example, point cloud is a set of discrete points that are distributed irregularly in space and express a spatial structure and a surface attribute of a three-dimensional object or scenario. Each point in the point cloud includes at least three-dimensional position information, and may further include a color, a material, or other information based on different application scenarios. Generally, each point in the point cloud includes a same number of additional attributes.

3. Point cloud media:

In an example, point cloud media is a typical 6 DoF immersive media. The point cloud media may flexibly and conveniently express a spatial structure and a surface attribute of a three-dimensional object or scenario, and therefore is widely applied to projects such as a virtual reality (VR) game, computer aided design (CAD), a geography information system (GIS), an autonomous navigation system (ANS), digital cultural heritage, free viewpoint broadcasting, three-dimensional immersive remote presentation, and biological tissue and organ three-dimensional reconstruction.

4. Track:

In an example, track is a set of media data in a media file encapsulation process, one media file may include one or more tracks. Usually, one media file may include one video track, one audio track, and one subtitle track.

5. Sample:

In an example, sample is an encapsulation unit in a media file encapsulation process, one track includes a plurality of samples. For example, one video track may include a plurality of samples, and usually, each sample is a video frame.

6. ISO based media file format (ISOBMFF) is an example of an encapsulation standard of a media file, and a typical ISOBMFF file is an MP4 file.

7. Dynamic adaptive streaming over HTTP (DASH) is an example of adaptive bit rate technology through which a high-quality streaming media may be transmitted on the Internet by using a conventional HTTP network server.

8. Media presentation description (MPD) is an example of a manifest file used to describe media segment information in a media file.

The embodiments of this disclosure relate to a data processing technology for an immersive media. Some concepts in a data processing process for the immersive media are described below, and specifically, the following embodiments of this disclosure are described by using an example in which the immersive media is a free viewpoint video.

FIG. 1*a* is a schematic diagram of 6 DoF according to an embodiment of this disclosure. The 6 DoF is classified into window 6 DoF, omni-directional 6 DoF, and 6 DoF, where the window 6 DoF refers to that rotation and movement of a viewer of the immersive media in an X axis and a Y axis are limited and translation thereof in a Z axis is limited. For example, the viewer of the immersive media cannot see a scene outside a window framework, and the viewer of the immersive media cannot pass through the window. The omni-directional 6 DoF refers to that rotation and movement of the viewer of the immersive media in the X axis, the Y axis, and the Z axis are limited. For example, the viewer of the immersive media cannot freely pass through three-dimensional 360-degree VR content in a limited movement region. The 6 DoF refers to that the viewer of the immersive media may translate freely in the X axis, the Y axis, and the Z axis. For example, the viewer of the immersive media may freely move in three-dimensional 360-degree VR content. Technologies similar to the 6 DoF include 3 DoF and 3 DoF+ production technologies.

Figure 1B:
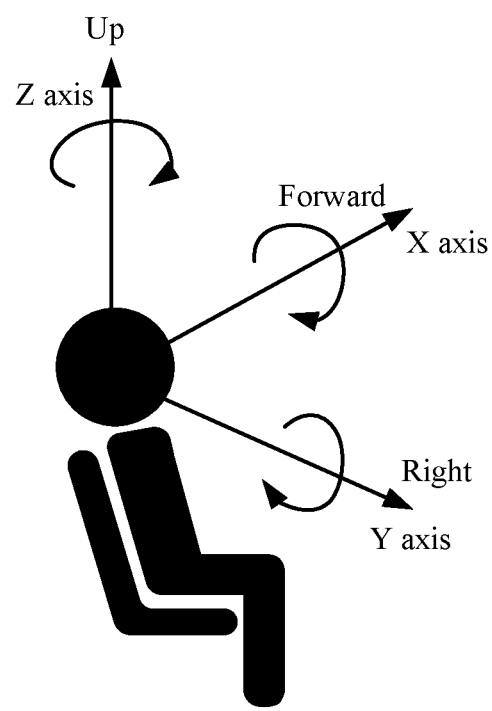
FIG. 1B is a schematic diagram of 3 DoF according to an embodiment of this disclosure.

FIG. 1B is a schematic diagram of 3 DoF according to an embodiment of this disclosure. As shown in FIG. 1B, the 3 DoF refers to that the viewer of the immersive media is fixed at a central point of a three-dimensional space, and the head of the viewer of the immersive media rotates along an X axis, a Y axis, and a Z axis to view a picture provided by media content.

Figure 1C:
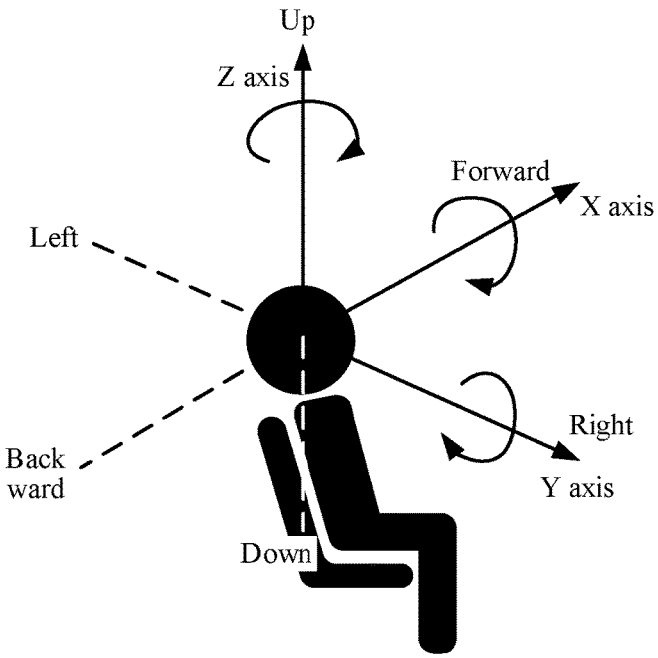
FIG. 1c is a schematic diagram of 3 DoF+ according to an embodiment of this disclosure.

FIG. 1*c* is a schematic diagram of 3 DoF+ according to an embodiment of this disclosure. As shown in FIG. 1*c*, the 3 DoF+ refers to that a virtual scenario provided by the immersive media includes specific depth information, and the head of the viewer of the immersive media may move in a limited space based on the 3 DoF to view the picture provided by the media content.

With the continuous development of technical technologies, at present, a large amount of point cloud data with high accuracy can be obtained within a short time period at low costs. Obtaining means of the point cloud data include: computer generation, three-dimensional (3D) laser scanning, and 3D photography measurement. Specifically, the point cloud data may be obtained through collection performed by a collection device (a group of cameras or a camera device including a plurality of lens and sensors) on a visual scenario in a real world. A point cloud of a three-dimensional object or scenario in a static real world may be obtained through 3D laser scanning, and millions pieces of point cloud data may be obtained per second. A point cloud of a three-dimensional object or scenario in a dynamic real world may be obtained through 3D photography, and tens of millions pieces of point cloud data may be obtained per second. In addition, in the medical field, point cloud data of biological tissues and organs may be obtained through magnetic resonance imaging (MRI), computed tomography (CT), and electromagnetic positioning information. In another example, the point cloud data may alternatively be directly generated by a computer based on a virtual three-dimensional object and scenario. For example, the computer may generate point cloud data of the virtual three-dimensional object and scenario. As large-scale point cloud data accumulates continuously, efficient storage, transmission, publishing, sharing, and standardization of the point cloud data have become a key of point cloud application.

Figure 1D:
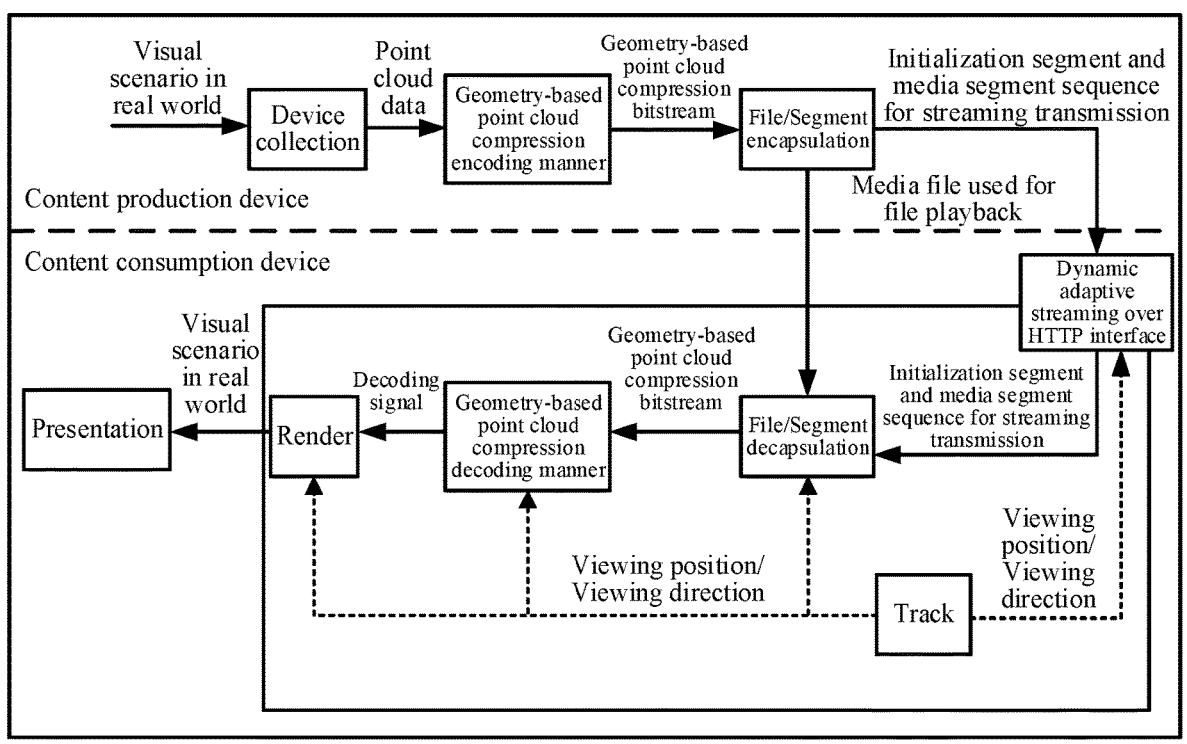
FIG. 1d is a diagram of a data processing architecture of a point cloud media according to an embodiment of this disclosure.

FIG. 1d is a diagram of a data processing architecture of a point cloud media according to an embodiment of this disclosure. As shown in FIG. 1d, a data processing process at a content production device end mainly includes: (1) an obtaining process of media content of point cloud data; and (2) an encoding and file encapsulation process of the point cloud data. A data processing process at a content consumption device end mainly includes: (3) a file decapsulation and decoding process of the point cloud data; and (4) a rendering process of the point cloud data. In addition, the content production device and the content consumption device relate to a point cloud media transmission process. The transmission process may be performed based on various transmission protocols. The transmission protocols herein may include, but not limited to: a dynamic adaptive streaming over HTTP (DASH) protocol, an HTTP live streaming (HLS) protocol, a smart media transport protocol (SMTP), and a transmission control protocol (TCP).

The following describes a data processing process of a point cloud media in further detail:

(1) Obtaining of media content of the point cloud media.

The media content of the point cloud media may be obtained in the following two manners: obtained by collecting a sound-visual scenario in a real world by using a capturing device and generated by using a computer. In an implementation, the capturing device may be a hardware component disposed in the content production device. For example, the capturing device is a microphone, a camera, or a sensor in a terminal. In another implementation, the capturing device may alternatively be a hardware apparatus connected to the content production device, such as a camera connected to a server. The capturing device is configured to provide a service for obtaining media content of point cloud data to the content production device. The capturing device may include, but not limited to: an audio device, a photographing device, and a sensing device. The audio device may include an audio sensor and a microphone. The photographing device may include a common camera, a three-dimensional camera, and an optical field camera. The sensing device may include a laser device and a radar device. There may be a plurality of capturing devices, and the capturing devices are deployed at some specific positions in real space to capture audio content and video content from different perspectives in the space simultaneously, where the captured audio content and video content are synchronized in time and space. Based on different obtaining manners, compression and encoding manners corresponding to media content of different point cloud data may also be different.

(2) Encoding and file encapsulation process of the media content of the point cloud media.

At present, a geometry-based point cloud compression (GPCC) encoding manner is usually used to perform encoding processing on obtained point cloud data, to obtain a geometry-based point cloud compression bitstream (including an encoded geometry bitstream and an encoded attribute bitstream). An encapsulation mode of the geometry-based point cloud compression bitstream includes a single-track encapsulation mode and a multi-track encapsulation mode.

The single-track encapsulation mode refers to that a point cloud stream is encapsulated by using a single track. In the single-track encapsulation mode, one sample may include one or more encoding content units (for example, one geometry encoding content unit and a plurality of attribute encoding content units), and an advantage of the single-track encapsulation mode lies in that: based on the point cloud stream, one point cloud file encapsulated by using a single track may be obtained without too much processing.

The multi-track encapsulation mode refers to that a point cloud stream is encapsulated by using a plurality of tracks. In the multi-track encapsulation mode, each track includes one component in the point cloud stream, where the track includes one geometry component track and one or more attribute component tracks, and an advantage of the multi-track encapsulation mode lies in that: different components are encapsulated respectively, so that a client selects a required component based on a requirement of the client to perform transmission and decoding consumption.

(3) File decapsulation and decoding process of the point cloud media.

The content consumption device may obtain a media file resource and corresponding media presentation description information of the point cloud data by using the content production device. The media file resource and media presentation description information of the point cloud data are transmitted to the content consumption device by the content production device through a transmission mechanism (for example, DASH or SMT). The file decapsulation process at the content consumption device end and the file encapsulation process at the content production device end are reverse. The content consumption device performs decapsulation on the media file resource based on a file format requirement of the point cloud media, to obtain an encoded bitstream (a GPCC bitstream or a VPCC bitstream). The decoding process at the content consumption device end and the encoding process at the content production device end are reverse. The content consumption device performs decoding on the encoded bitstream, to restore the point cloud data.

(4) Rendering process of the point cloud media.

The content consumption device performs rendering on the point cloud data obtained by decoding the GPCC bitstream by using metadata related to render and window in the media presentation description information, to obtain a point cloud frame of the point cloud media, and presents the point cloud media based on presentation time of the point cloud frame.

In an embodiment, the content production device end first performs sampling on a visual scenario of a real world by using a collection device, to obtain point cloud data corresponding to the visual scenario of the real world; performs encoding processing on the obtained point cloud data based on geometry-based point cloud compression (GPCC), to obtain a GPCC bitstream (including an encoded geometry bitstream and an encoded attribute bit stream); and performs encapsulation on the GPCC bitstream to obtain a media file (that is, a point cloud media) corresponding to the point cloud data. Specifically, the content production device combines, based on a specific media container file format, one or more encoded bitstreams into a media file used for file playback or an initialization segment and media segment sequence used for streaming transmission. The media container file format refers to an ISO basic media file format set forth in the International Organization for Standardization (ISO)/International Electrotechnical Commission (IEC) 14496-12. In an implementation, the content production device further encapsulates metadata into the media file or the initialization/media segment sequence, and transmits the initialization/media segment sequence to the content consumption device through a transmission mechanism (for example, a DASH interface).

The content consumption device end first receives a point cloud media file transmitted by the content production device, where the point cloud media file includes the media file used for file playback or the initialization segment and media segment sequence used for streaming transmission; performs decapsulation processing on the point cloud media file, to obtain an encoded GPCC bitstream; and parses the encoded GPCC bitstream (that is, performs decoding processing on the encoded GPCC bitstream to obtain the point cloud data). In a specific implementation, the content consumption device determines the media file or the media segment sequence required for presenting the point cloud media based on a viewing position/viewing direction of a current object; performs decoding processing on the media file or the media segment sequence required for presenting the point cloud media, to obtain the point cloud data required for presentation; and renders the decoded point cloud data based on the viewing (window) direction of the current object, to obtain a point cloud frame of the point cloud media, and presents the point cloud media on a screen of a head-mounted display carried by the content consumption device or any other display device based on presentation time of the point cloud frame. The viewing position/viewing direction of the current object may be determined by a head tracking function and a visual tracking function. In addition to rendering the point cloud data of the viewing position/viewing direction of the current object by using a renderer, decoding and optimization may be further performed on audio in the viewing (window) direction of the current object by using an audio decoder.

The content production device and the content consumption device may jointly form a point cloud media system. The content production device may be a computer device used by a provider of the point cloud media (for example, a content producer of the point cloud media), and the computer device may be a terminal (for example, a personal computer (PC) or a smart mobile device (such as a smartphone)) or a server. The server may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The content consumption device may be a computer device used by a user of the point cloud media (for example, a viewer of the point cloud media), and the computer device may be a terminal (for example, a personal computer (PC), a smart mobile device (such as a smartphone), a VR device (such as a VR helmet or VR glasses), a smart home appliance, a vehicle-mounted terminal, and an aerial vehicle).

It may be understood that the data processing technology for a point cloud media involved in this disclosure may be implemented based on a cloud technology. For example, a cloud server is used as a content production device. The cloud technology is a hosting technology that unifies a series of resources such as hardware, software, and networks in a wide area network or a local area network to implement computing, storage, processing, and sharing of data.

During actual application, the content production device may guide, through a sequence header and decoding indication information of each point cloud frame, the content consumption device to decode and present stream data of each point cloud frame. For a syntax of the sequence header, reference may be made to the following Table 1:

TABLE 1

| sequence_header( ) { | Descriptor |
|---|---|
| profile_id | u(8) |
| level_id | u(8) |
| sequence_parameter_set_id | ue(v) |
| marker_bit | f(1) |
| bounding_box_offset_x_upper | se(v) |
| marker_bit | f(1) |
| bounding_box_offset_x_lower | se(v) |
| marker_bit | f(1) |
| bounding_box_offset_y_upper | se(v) |
| marker_bit | f(1) |
| bounding_box_offset_y_lower | se(v) |
| marker_bit | f(1) |
| bounding_box_offset_z_upper | se(v) |
| marker_bit | f(1) |
| bounding_box_offset_z_lower | se(v) |
| marker_bit | f(1) |
| bounding_box_size_width_upper | ue(v) |
| marker_bit | f(1) |
| bounding_box_size_width_lower | ue(v) |
| marker_bit | f(1) |
| bounding_box_size_height_upper | ue(v) |
| marker_bit | f(1) |
| bounding_box_size_height_lower | ue(v) |
| marker_bit | f(1) |
| bounding_box_size_depth_upper | ue(v) |
| marker_bit | f(1) |
| bounding_box_size_depth_lower | ue(v) |
| marker_bit | f(1) |
| quant_step_upper | u(16) |
| marker_bit | f(1) |
| quant_step_lower | u(16) |
| geomRemoveDuplicateFlag | u(1) |
| marker bit | f(1) |
| attribute_present_flag | |
| if (attribute_present_flag) { | |
| attribute_adapt_pred | u(1) |
| attribute_qp | ue(v) |
| maxNumAttributesMinus1 | u(4) |
| } | |
| byte_alignment( ) | |
| } | |

The profile_id field is used to indicate a profile whose bit stream is satisfied, and a value of the profile_id field is an 8-bit unsigned integer. The level_id field is used to indicate a level whose bit stream is satisfied, and a value of the level_id field is an 8-bit unsigned integer.

The sequence_parameter_set_id field is used to provide a sequence parameter set (SPS) identifier for reference of other syntax elements, and the identifier is an integer ranging from 0 to 31.

The bounding_box_offset_x_upper field is used to indicate a number of bits above 16 bits of an x coordinate of a bounding box, and a value of the bounding_box_offset_x_upper field is an unsigned integer. The bounding_box_offset_x_lower field is used to indicate lower 16 bits of an x coordinate of an origin of the bounding box, and a value of the bounding_box_offset_x_lower field is an unsigned integer. The x coordinate of the origin of the bounding box is: bounding_box_offset_x=(bounding_box_offset_x_upper)<<16+bounding_box_offset_x_lower.

The bounding_box_offset_y_upper field is used to indicate a number of bits above 16 bits of a y coordinate of the bounding box, and a value of the bounding_box_offset_y_upper field is an unsigned integer. The bounding_box_offset_y_lower field is used to indicate lower 16 bits of a y coordinate of the origin of the bounding box, and a value of the bounding_box_offset_y_lower field is an unsigned integer. The y coordinate of the origin of the bounding box is: bounding_box_offset_y=(bounding_box_offset_y_upper)<<16+bounding_box_offset_y_lower.

The bounding_box_offset_z_upper field is used to indicate a number of bits above 16 bits of a z coordinate of the bounding box, and a value of the bounding_box_offset_z_upper field is an unsigned integer. The bounding_box_offset_z_lower field is used to indicate lower 16 bits of a z coordinate of the origin of the bounding box, and a value of the bounding_box_offset_z_lower field is an unsigned integer. The z coordinate of the origin of the bounding box is: bounding_box_offset_z=(bounding_box_offset_z_upper)<<16+bounding_box_offset_z_lower.

The bounding_box_size_width_upper field is used to indicate a number of bits above 16 bits of a width of the bounding box, and a value of the bounding_box_size_width_upper field is an unsigned integer. The bounding_box_size_width_lower field is used to indicate lower 16 bits of the width of the bounding box, and a value of the bounding_box_size_width_lower field is an unsigned integer. The width of the bounding box is: bounding_box_size_width=(bounding_box_size_width_upper)<<16+bounding_box_size_width_lower.

The bounding_box_size_height_upper field is used to indicate a number of bits above 16 bits of a height of the bounding box, and a value of the bounding_box_size_height_upper field is an unsigned integer. The bounding_box_size_height_lower field is used to indicate lower 16 bits of the height of the bounding box, and a value of the bounding_box_size_height_lower field is an unsigned integer. The height of the bounding box is: bounding_box_size_height=(bounding_box_size_height_upper)<<16+bounding_box_size_height_lower.

The bounding_box_size_depth_upper field is used to indicate a number of bits above 16 bits of a depth of the bounding box, and a value of the bounding_box_size_depth_upper field is an unsigned integer. The bounding_box_size_depth_lower field is used to indicate lower 16 bits of the depth of the bounding box, and a value of the bounding_box_size_depth_lower field is an unsigned integer. The depth of the bounding box is: bounding_box_size_depth=(bounding_box_size_depth_upper)<<16+bounding_box_size_depth_lower.

The quant_step_upper field is used to indicate upper 16 bits of a floating point number whose quantization step is 32 bits, and a value of the quant_step_upper field is a 16-bit number. The quant_step_lower field is used to indicate lower 16 bits of the floating point number whose quantization step is 32 bits, and a value of the quant_step_lower field is a 16-bit number. The quantization step is: quant_step=(float)((quant_step_upper<<16)+quant_step_lower).

A value of the geomRemoveDuplicateFlag field is a binary variable. When the value of the geomRemoveDuplicateFlag field is '1', it indicates to remove duplicated points before geometry encoding, namely, remove points whose geometric positions are the same; and when the value of the geomRemoveDuplicateFlag field is '0', it indicates not to remove duplicated points.

A value of the attribute_present_flag field is a binary variable. When the value of the attribute_present_flag field is '1', it indicates that the stream includes attribute encoding; and when the value of the attribute_present_flag field is '0', it indicates that the stream does not include attribute encoding.

A value of the maxNumAttributesMinus1 field is an unsigned integer. When the value of the maxNumAttributesMinus1 field is increased by 1, it indicates a maximum number of attribute encoding supported by a current standard stream. The value of the maxNumAttributesMinus1 field is an integer ranging from 0 to 15. When the stream does not include the maxNumAttributesMinus1 field, it is considered by default that the value of the maxNumAttributesMinus1 field is 0.

A value of the attribute_adapt_pred field is a binary variable. When the value of the attribute_adapt_pred field is '0', it indicates that a prediction method is not selected adaptively; and when the value of the attribute_adapt_pred field is '1', it indicates that switching from a geometric position-based prediction method to an attribute value-based prediction method is allowed.

The attribute_qp field is used to indicate an attribute quantization parameter, and a value of the attribute_qp field is an unsigned integer.

In addition, ue(v) is an unsigned integer and is a syntax element of exponential-Golomb encoding, where a left bit is first. se(v) is a signed integer and is a syntax element of exponential-Golomb encoding, where a left bit is first. u(n) is an n-bit unsigned integer. In the syntax table, if n is 'v', a number of bits thereof is determined based on another syntax element. f(n) is an n-bit fixed mode bit string.

The decoding indication information of each point cloud frame includes information about a geometry header, and for a syntax of the geometry header, reference may be made to the following Table 2:

TABLE 2

| geometry_header( ) { | Descriptor |
|---|---|
| geometry_parameter_set_id | ue(v) |
| geometry_sequence_parameter_set_id | ue(v) |
| gps_lcu_node_size_log2_minus_one | ue(v) |
| gps_implicit_geom_partition_flag | u(1) |
| if( gps_implicit_geom_partition_flag ) { | |
|   gps_max_num_implicit_qtbt_before_ot | ue(v) |
|     gps_min_size_implicit_qtbt | ue(v) |
| } | |
| gps_single_mode_flag | u(1) |
| gps_save_state_flag | u(1) |
| byte_alignment( ) | |
| } | |

The geometry_parameter_set_id field is used to provide a geometry parameter identifier for reference of other syntax elements, and the identifier is an integer ranging from 0 to 31.

The geometry_sequence_parameter_set_id field is used to determine a sequence parameter set (SPS) identifier for use of a current geometry parameter set. The identifier is an integer ranging from 0 to 31, and for all geometry parameter sets under a same point cloud, values of the geometry_sequence_parameter_set_id fields are consistent.

A value of the gps_lcu_node_size_log2_minus_one field is an unsigned integer. When the value of the gps_lcu_node_size_log2_minus_one field is '0', it indicates to disable block structure encoding; and when the value of the gps_lcu_node_size_log2_minus_one field is greater than '0', it indicates to enable block structure encoding, and a size of a geometry node of a macroblock is defined, namely: gps_lcu_node_size_log2=gps_lcu_node_size_log2_minus_one+1.

A value of the gps_implicit_geom_partition_flag field is a binary variable. When the value of the gps_implicit_geom_partition_flag field is '0', it indicates that geometry implicit partition is disabled; and when the value of the gps_implicit_geom_partition_flag field is '1', it indicates that geometry implicit partition is enabled.

The gps_max_num_implicit_qtbt_before_ot field is used to indicate a maximum number of allowed quadtree partition or binary tree partition before octree partition in geometry implicit partition. A value of the field is an unsigned integer.

The gps_min_size_implicit_qtbt field is used to indicate a minimum allowed partition size of quadtree or binary tree partition in geometry implicit partition. A value of the field is an unsigned integer.

A value of the gps_single_mode_flag field is a binary variable. When the value of the gps_single_mode_flag field is '0', it indicates that a geometry single point encoding mode is disabled; and when the value of the gps_single_mode_flag field is '1', it indicates that the geometry single point encoding mode is enabled.

When the value of the gps_implicit_geom_partition_flag field is '1', the gps_max_num_implicit_qtbt_before_ot field and the gps_min_size_implicit_qtbt field need to be limited based on a root node logarithm size, and a specific process is shown in Table 3:

TABLE 3

```
if (gps_max_num_implicit_qtbt_before_ot > (gsh_log2_max_
nodesize - gsh_log2_min_nodesize))
    gps_max_num_implicit_qtbt_before_ot = gsh_log2_max_
nodesize - gsh_log2_min_nodesize;
    if (gps_min_size_implicit_qtbt > gsh_log2_min_nodesize)
        gps_min_size_implicit_qtbt = gsh_log2_min_nodesize;
    if (gsh_log2_max_nodesize == gsh_log2_min_nodesize)
        gps_min_size_implicit_qtbt = 0;
```

A value of the gps_save_stat_flag field is a binary variable. When the value of the gps_save_stat_flag field is '0', it indicates not to save an encoding state (namely, entropy encoding context and hash table information of geometry encoding); and when the value of the gps_save_stat_flag field is '1', it indicates to save the encoding state.

In addition, ue(v) is an unsigned integer and is a syntax element of exponential-Golomb encoding, where a left bit is first. u(n) is an n-bit unsigned integer.

The decoding indication information of each point cloud frame further includes information about an attribute header, and for a syntax of the attribute header, reference may be made to the following Table 4:

TABLE 4

| attribute_header( ) { | Descriptor |
|---|---|
| attribute_parameter_set_id | ue(v) |
| attribute_sequence_parameter_set_id | ue(v) |
| for ( attrIdx = 0; attrIdx < | |
| (maxNumAttributesMinus1 + 1); attrIdx ++ ){ | |
|   attributePresentFlag [ attrIdx ] | u(1) |
|   if(attributePresentFlag [ attrIdx ]){ | |
|     outputBitDepthMinus1 [ attrIdx ] | ue(v) |
|     if (attrIdx == 0 \|\| attrIdx == 1) { | |
|       maxNumOfNeighboursLog2Minus7[ attrIdx ] | u(2) |
|       numOflevelOfDetail[ attrIdx ] | ue(v) |
|       maxNumOfPredictNeighbours[ attrIdx ] | ue(v) |
|       intraLodFlag[ attrIdx ] | u(1) |

TABLE 4-continued

| attribute_header( ) { | Descriptor |
|---|---|
|       crossAttrTypePred | u(1) |
|       if (crossAttrTypePred){ | |
|         attrEncodeOrder | u(1) |
|         crossAttrTypePredParam1 | u(15) |
|         crossAttrTypePredParam2 | u(21) |
|       } | |
|     } | |
|     if (attrIdx == 0) { | |
|       cross_component_Pred | u(1) |
|       half_zero_runlength_enable | u(1) |
|       chromaQpOffsetCb | se(v) |
|       chromaQpOffsetCr | se(v) |
|       colorReorderMode | ue(v) |
|     } | |
|     if (attrIdx == 1) { | |
|       nearestPredParam1 | ue(v) |
|       nearestPredParam2 | ue(v) |
|       axisBias | ue(v) |
|       refReorderMode | ue(v) |
|     } | |
|   } | |
| } | |
| transform | ue(v1) |
| if (transform && | |
|   ( attributePresentFlag[0] \|\| attributePresentFlag[1]) ) { | |
|   attrTransformQpDelta | ue(v) |
|   attrTransformNumPoints | ue(v) |
|   maxTransNum | ue(v) |
|   QpOffsetDC | se(v) |
|   QpOffsetAC | se(v) |
|   if ( attributePresentFlag[0]) { | |
|     chromaQpOffsetDC | se(v) |
|     chromaQpOffsetAC | se(v) |
|   } | |
|   if ( attributePresentFlag[1]) { | |
|     RefGroupPred | u(1) |
|   } | |
| } | |
| byte_alignment( ) | |
| } | |

The attribute_parameter_set_id field is used to provide an attribute parameter identifier for reference of other syntax elements, and the identifier is an integer ranging from 0 to 31.

The attribute_sequence_parameter_set_id field is used to determine a sequence parameter set (SPS) identifier for use of a current attribute parameter set. The identifier is an integer ranging from 0 to 31, and for all attribute parameter sets under a same point cloud, values of the attribute_sequence_parameter_set_id fields are consistent.

A value of the attributePresentFlag[attrIdx] field is a binary variable. When the value of the attributePresentFlag[attrIdx] field is '1', it indicates that the current stream includes (attrIdx)$^{th}$ attribute encoding; and when the value of the attributePresentFlag[attrIdx] field is '0', it indicates that the current stream does not include (attrIdx)$^{th}$ attribute encoding. attrIdx is an integer ranging from 0 to 15. Meanings of attrIdx are indicated by a Table x attribute encoding mapping table, and the Table x attribute encoding mapping table is shown in the following Table 5:

TABLE 5

| Value of attr_idx | Attribute description |
|---|---|
| 0 | Color |
| 1 | Reflectivity |
| 2 to 15 | Reserved |

The transform field is used to control whether to use wavelet transform to perform attribute encoding. A value of the field is a binary variable, and when the value of the transform field is '1', it indicates to use wavelet transform; and when the value of the transform field is '0', it indicates to use a prediction method to perform attribute encoding.

The attrTransformQpDelta field is used to indicate a difference with an attribute residual quantization parameter. A value of the field is an unsigned integer. An attribute transform coefficient quantization parameter is: attrTransformQp=attrQuanParam+attrTransformQpDelta The attrTransformNumPoints field is used to indicate a number of points on which attribute transform is performed (namely, attrTransformNumPoints points are used to perform wavelet transform). When a value of the attrTransformNumPoints field is 0, it indicates to use all points in a slice to perform wavelet transform. The value of the field is an unsigned integer.

The maxNumOfNeighbour_log2_minus7 field is used to export a variable maxNumOfNeighbour, to indicates a maximum number of encoded neighbors that may be used for search to control a search range of neighbor candidate points and a number of points cached by hardware during attribute prediction, and a value of the field is an unsigned integer. maxNumOfNeighbour is calculated through the following formula:

$$maxNumOfNeighbour=2^{(maxNumOfNeighbor\_log2\_minus7+7)}$$

maxNumOfNeighbour_log2_minus7 is an integer ranging from 0 to 3.

A value of the cross_component_pred field is a binary variable. When the value of the cross_component_pred field is '1', it indicates that attribute residual quadratic prediction is allowed; and when the value of the cross_component_pred field is '0', it indicates that attribute residual quadratic prediction is not allowed.

A value of the half zero_runlength_enable field is a binary variable. When the value of the half zero_runlength_enable field is '1', it indicates that zero runlength half is enabled; and when the value of the half zero_runlength_enable field is '0', it indicates that zero runlength half is disabled.

The chromaQpOffsetCb field is used to control a quantization parameter of a Cb channel, and a value of the field is a signed integer which ranges from −16 to 16. If the information about the current attribute header does not include chromaQpOffsetCb, it indicates that the value of chromaQpOffsetCb is 0. That is, choramQpCb=Clip3 (minQP,MaxQP,attribute_qp+chromaQpOffsetCb). A quantization parameter of a luminance channel is lumaQp=attribute_qp, where a minimum supported quantization parameter minQP is 0, and a maximum supported quantization parameter maxQP is 63.

The chromaQpOffsetCr field is used to control a quantization parameter of a Cr channel, and a value of the field is a signed integer which ranges from −16 to 16. If the information about the current attribute header does not include chromaQpOffsetCr, it indicates that the value of chromaQpOffsetCr is 0. That is, choramQpCr=Clip3 (minQP,MaxQP,attribute_qp+chromaQpOffsetCr). A quantization parameter of a luminance channel is lumaQp=attribute_qp, where a minimum supported quantization parameter minQP is 0, and a maximum supported quantization parameter maxQP is 63.

The nearestPredParam1 field is used to control a threshold of nearest neighbor point prediction, and a value of the field is an unsigned integer.

The nearestPredParam2 field is used to control a threshold of nearest neighbor point prediction, and a value of the field is an unsigned integer. Specifically, the threshold of nearest neighbor point prediction is:

attrQuantParam*nearestPredParam1+nearestPredParam1

The axisBias field is used to control an offset in a Z direction in calculation of an attribute prediction value, and a value of the field is an unsigned integer.

The outputBitDepthMinus1 field is used to control an attribute output bit depth. A value of the field is an unsigned integer and ranges from 0 to 15. The attribute output bit depth is: outputBitDepth=outputBitDepthMinus1+1. If the syntax element is not included in the stream, it indicates that the value of the outputBitDepthMinus1 field is a default value (0).

The numOflevelOfDetail field is used to control a number of layers of levels of detail (LoD) partitioned during attribute prediction. A value of the field is an unsigned integer. In a stream that satisfies the current part, the value of numOflevelOfDetail is not to be greater than 32.

The maxNumOfPredictNeighbours field is used to limit a number of neighbor points selected during attribute prediction. A value of the field is an unsigned integer. In a stream that satisfies the current part, the value of maxNumOfPredictNeighbours is not to be greater than 16.

The intraLodFlag field is used to control whether to enable intra-layer prediction. A value of the field is a binary variable, and when the value of the intraLodFlag field is '1', it indicates to enable intra-layer prediction; and when the value of the intraLodFlag field is '0', it indicates to disable intra-layer prediction.

The colorReorderMode field is used to indicate a reorder mode selected for current color information. A value of the field is an unsigned integer. When the value of the colorReorderMode is "0", it indicates to use an original point cloud input order; when the value of the colorReorderMode is "1", it indicates to use Hilbert reorder; and when the value of the colorReorderMode is "2", it indicates to use Morton reorder.

The refReorderMode field is used to indicate a reorder mode selected for current reflectivity information. A value of the field is an unsigned integer. When the value of the refReorderMode is "0", it indicates to use an original point cloud input order; when the value of the refReorderMode is "1", it indicates to use Hilbert reorder; and when the value of the refReorderMode is "2", it indicates to use Morton reorder.

The attrEncodeOrder field is used to control an attribute encoding order when a point cloud includes a plurality of attribute types. A value of the field is a binary variable. When the value of the attrEncodeOrder field is '0', it indicates that the color is first encoded, and the reflectivity is then encoded; and when the value of the attrEncodeOrder field is '1', it indicates that the reflectivity is first encoded, and the color is then encoded.

The crossAttrTypePred field is used to indicate whether cross-type attribute prediction is allowed. A value of the field is a binary variable, and when the value of the crossAttrTypePred field is '1', it indicates that cross-type attribute prediction is allowed; and when the value of the crossAttrTypePred field is '0', it indicates that cross-type attribute prediction is not allowed.

The crossAttrTypePredParam1 field is used to control a weight parameter 1 for calculating a geometric information distance and an attribute information distance in cross-type attribute prediction. A value of the field is a 15-bit unsigned integer.

The crossAttrTypePredParam2 field is used to control a weight parameter 2 for calculating a geometric information distance and an attribute information distance in cross-type attribute prediction. A value of the field is a 21-bit unsigned integer.

The refGroupPred field is used to control whether to enable a reflectivity group prediction mode of prediction transform. A value of the field is a binary variable, and when the value of the refGroupPred field is '1', it indicates to enable group prediction; and when the value of the refGroupPred field is '0', it indicates to disable group prediction.

In addition, ue(v) is an unsigned integer and is a syntax element of exponential-Golomb encoding, where a left bit is first. se(v) is a signed integer and is a syntax element of exponential-Golomb encoding, where a left bit is first. u(n) is an n-bit unsigned integer. In the syntax table, if n is 'v', a number of bits thereof is determined based on another syntax element.

The decoding indication information of each point cloud frame further includes an attribute slice header, and for a syntax of the attribute slice header, reference may be made to the following Table 6:

TABLE 6

| attribute_slice_header( ) { | Descriptor |
| --- | --- |
| slice_id | ue(v) |
| byte_alignment( | |
| } | |

The slice_id field is used to indicate an identifier of an attribute slice, and a value of the field is an unsigned integer. ue(v) is an unsigned integer and is a syntax element of exponential-Golomb encoding, where a left bit is first.

It may be recognized from the sequence header and the decoding indication information of each point cloud frame that, although one attribute header (attribute_header) is included in attribute data to indicate attribute-related parameters, the following problems exist: (1) Each point cloud frame includes a geometry header, an attribute header, and one or more pieces of point cloud slice data. However, one point cloud attribute slice includes all attribute data, and consequently different point cloud attributes cannot correspond to different point cloud attribute slices. (2) For one type of point cloud attribute, merely one group of point cloud data of the type exists.

Based on this, this disclosure provides a data processing method for a point cloud media, to extend fields at a high-level syntax level of a stream, so as to distinguish a type of each point cloud attribute from a unique identifier, support a plurality of attribute headers to indicate attribute-related parameters, and support a plurality of groups of point cloud data including a same point cloud type. This disclosure may be applied to links such as a content production device, a content consumption device, and an intermediate node of a point cloud media system. A point cloud sequence is a top-level syntactic structure of a bit stream, and the point cloud sequence starts from a sequence header. In addition, the point cloud sequence further includes stream data of one or more point cloud frames, the stream data of each point cloud frame corresponds to decoding indication information, and the decoding indication information of each point cloud frame includes a geometry header, an attribute header, and one or more pieces of point cloud slice data. Each point cloud slice includes a point cloud geometry slice and a point cloud attribute slice. The point cloud geometry slice includes a geometry slice header and geometric information. The point cloud attribute slice includes an attribute slice header and attribute information. The following describes a form in which an audio video coding standard (AVS) and a geometry-based point cloud compression (GPCC) stream high-level syntax are extended to define a point cloud high-level syntax information indication method by using examples. High-level syntax elements include a sequence header, an attribute header, and an attribute slice header. In an implementation, the decoding indication information of each point cloud frame includes a plurality of attribute headers, each attribute header corresponds to one or more point cloud attribute slices, and values of attribute identifier fields of the point cloud attribute slices are the same. Extension of the sequence header is shown in Table 7:

TABLE 7

| sequence_header( ) { | Descriptor |
| --- | --- |
| profile_id | u(8) |
| level_id | u(8) |
| ...... | ...... |
| attribute_present_flag | |
| if (attribute_present_flag) { | |
|   attribute_adapt_pred | u(1) |
|   attribute_qp | ue(v) |
|   maxNum AttributesMinus1 | u(4) |
|   for(i=0; i<(maxNumAttributesMinus1 + 1); i++){ | |
|     attributeIdentifier[i] | u(8) |
|     attributeSliceDataType[i] | u(4) |
|   } | |
| } | |
| byte_alignment( ) | |
| } | |

The attributeIdentifier field is used to indicate attribute data of each point cloud frame, and values of attribute identifier fields corresponding to various groups of data instances of attribute data of each type of each point cloud frame are different (that is, one group of data instances of attribute data of each type correspond to one unique attribute data identifier). (For example, if the stream includes two groups of different color data, a value of an attribute identifier field corresponding to each group of color data instances differs).

The attributeSliceDataType field is used to indicate a type of attribute data in a point cloud slice. When a value of the attributeSliceDataType field is 0, it indicates that the point cloud slice merely includes attribute data of a color type; when a value of the attributeSliceDataType field is 1, it indicates that the point cloud slice merely includes attribute data of a reflectivity type; or when a value of the attributeSliceDataType field is 2, it indicates that the point cloud slice includes attribute data of a color type and attribute data of a reflectivity type, and prediction crossing the two attribute types is allowed during attribute prediction. For syntaxes of remaining fields in the sequence header, reference may be made to Table 1, and details are not described herein again.

Corresponding to Table 7, extension of the attribute header is shown in Table 8:

TABLE 8

| attribute_header( ) { | Descriptor |
| --- | --- |
| attributeIdentifier | u(8) |
| attributeSliceData Type | u(4) |

TABLE 8-continued

| attribute_header( ) { | Descriptor |
|---|---|
|   transform | u(1) |
|   if (transform) { | |
|     attrTransformQpDelta | ue(v) |
|     attrTransformNumPoints | ue(v) |
|     maxTransNum | ue(v) |
|     QpOffsetDC | ue(v) |
|     QpOffsetAC | ue(v) |
|     if (attributeSliceDataType == 0 \|\| attributeSliceDataType == 2) { | |
|       chromaQpOffsetDC | ue(v) |
|       chromaQpOffsetAC | ue(v) |
|     } | |
|     if ( attributeSliceDataType == 1 \|\| attributeSliceDataType == 2) { | |
|       RefGroupPred | u(1) |
|     } | |
|   } | |
|   if (attributeSliceDataType == 0 \|\| attributeSliceDataType == 2) { | |
|     cross_component_Pred | u(1) |
|     half_zero_runlength_enable | u(1) |
|     chromaQpOffsetCb | se(v) |
|     chromaQpOffsetCr | se(v) |
|     colorReorderMode | ue(v) |
|   } | |
|   if (attributeSliceDataType == 1 \|\| attributeSliceDataType == 2) { | |
|     nearestPredParam1 | ue(v) |
|     nearestPredParam2 | ue(v) |
|     axisBias | ue(v) |
|     refReorderMode | ue(v) |
|   } | |
|   if (attributeSliceDataType == 2) { | |
|     attrEncodeOrder | u(1) |
|     crossAttrTypePredParam1 | u(15) |
|     crossAttrTypePredParam2 | u(21) |
|   } | |
|   outputBitDepthMinus1 | ue(v) |
|   maxNumOfNeighboursLog2Minus7 | u(2) |
|   numOflevelOfDetail | |
|   maxNumOfPredictNeighbours | ue(v) |
|   intraLodFlag | u(1) |
|   byte_alignment( ) | |
| } | |

For syntaxes of fields in the attribute header (Table 8), reference may be made to Table 4 and Table 7.

Corresponding to Table 7 and Table 8, extension of the attribute slice header is shown in Table 9:

TABLE 9

| attribute_slice_header( ) { | Descriptor |
|---|---|
|   slice_id | ue(v) |
|   attributeIdentifier | u(8) |
|   byte_alignment( ) | |
| } | |

For syntaxes of fields in the attribute slice header (Table 9), reference may be made to Table 6 and Table 7.

In another implementation, the decoding indication information of each point cloud frame includes one attribute header. By indicating the attributeIdentifier field and the attributeSliceDataType field respectively, the attribute data in the point cloud attribute slice may be distinguished, a correspondence between the point cloud attribute slice and the attribute header may be determined, and a plurality of groups of point cloud data including a same point cloud type may be supported. For extension of the sequence header, reference may be made to Table 7, and extension of the attribute header is shown in Table 10:

TABLE 10

| attribute_header( ) { | Descriptor |
|---|---|
|   transform | u(1) |
|   if (transform) { | |
|     attrTransformQpDelta | ue(v) |
|     attrTransformNumPoints | ue(v) |
|     maxTransNum | ue(v) |
|     QpOffsetDC | ue(v) |
|     QpOffsetAC | ue(v) |
|   } | |
|   for (i= 0; i < (maxNumAttributesMinus1 + 1); i ++ ){ | |
|     attributeIdentifier[i] | u(8) |
|     attributeSliceDataType[i] | u(4) |
|     outputBitDepthMinus1 [i] | ue(v) |
|     maxNumOfNeighboursLog2Minus7[i] | u(2) |
|     numOflevelOfDetail[ i ] | ue(v) |
|     maxNumOfPredictNeighbours[ i ] | ue(v) |
|     intraLodFlag[ i ] | u(1) |
|     if (attributeSliceDataType[i] == 2){ | |
|       attrEncodeOrder | u(1) |
|       crossAttrTypePredParam1 | u(15) |
|       crossAttrTypePredParam2 | u(21) |
|     } | |
|     if (attributeSliceDataType[i] == 0 \|\| attributeSliceDataType[i] == 2) { | |
|       cross_component_Pred | u(1) |
|       half_zero_runlength_enable | u(1) |
|       chromaQpOffsetCb | se(v) |
|       chromaQpOffsetCr | se(v) |
|       colorReorderMode | ue(v) |
|     } | |
|     if (attributeSliceData Type[i] == 1 \|\| attributeSliceDataType[i] == 2) { | |
|       nearestPredParam1 | ue(v) |
|       nearestPredParam2 | ue(v) |
|       axisBias | ue(v) |
|       refReorderMode | ue(v) |
|     } | |
|     if (transform && (attributeSliceDataType == 0 \|\| attributeSliceDataType == 2)) { | |
|       chromaQpOffsetDC | ue(v) |
|       chromaQpOffsetAC | ue(v) |
|     } | |
|     if (transform && (attributeSliceDataType == 1 \|\| attributeSliceDataType == 2)) { | |
|       RefGroupPred | u(1) |
|     } | |
|   } | |
|   byte_alignment( ) | |
| } | |

For syntaxes of fields in the attribute header (Table 10), reference may be made to Table 4 and Table 7.

Corresponding to Table 7 and Table 10, extension of the general_attribute_data_bitstream is shown in Table 11:

TABLE 11

| general_attribute_data_bitstream( ) { | Descriptor |
|---|---|
|   If (attributeSliceDataType[i] == 1 \|\| attributeSliceDataType[i] == 2) { | |
|     attribute_data_reflectance( ) | |
|     byte_alignment( ) | |
|   } | |
|   if (attributeSliceDataType[i] == 0 \|\| attributeSliceDataType[i] == 2) { | |
|     attribute_data_color( ) | |
|     byte_alignment( ) | |
|   } | |
|   attributeIdentifier[i] | |
|   byte_alignment( ) | |
| } | |

For syntaxes of fields in the general_attribute_data_bitstream, reference may be made to Table 7.

In the embodiments of this disclosure, the attribute data of each point cloud frame is indicated through the attribute identifier field and the attribute slice data type field, so that the attribute data of each point cloud frame can be distinguished. In addition, a correspondence between the attribute header and the sequence header or the attribute slice header/attribute data bitstream is established through the attribute identifier field, so that the decoding indication information of each point cloud frame may include at least two attribute headers, and a plurality of groups of point cloud data including a same point cloud type is supported, thereby enriching a decoding indication manner of the point cloud media. Therefore, more flexible file encapsulation and transmission manners and more diversified point cloud application forms can be supported.

Figure 2:
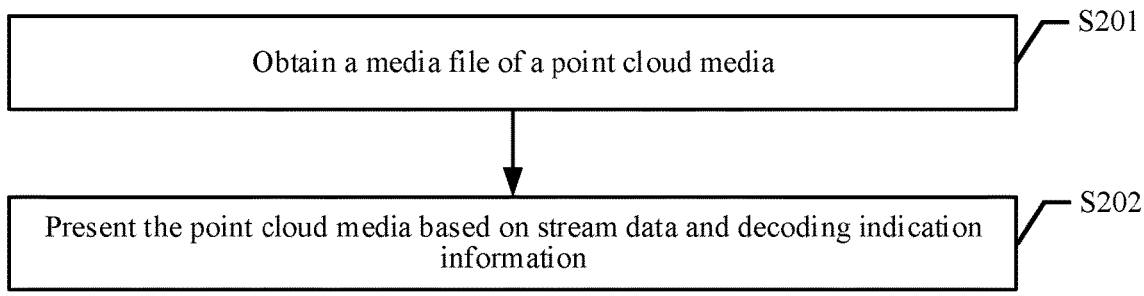
FIG. 2 is a flowchart of a data processing method for a point cloud media according to an embodiment of this disclosure.

FIG. 2 is a flowchart of a data processing method for a point cloud media according to an embodiment of this disclosure. The method may be performed by a content consumption device in a point cloud media system, and the method includes the following step S201 and step S202:

S201. Obtain a media file of the point cloud media.

The media file includes stream data of each point cloud frame and decoding indication information of each point cloud frame. The decoding indication information of each point cloud frame includes at least two attribute headers (attribute_header), and each attribute header includes an attribute identifier (attributeIdentifier) field, where the field is used to indicate attribute data of each point cloud frame, values of attribute identifier fields corresponding to various groups of data instances of attribute data of each type of each point cloud frame are different (that is, one group of data instances of attribute data of each type correspond to one unique attribute data identifier), and a value of the attribute identifier field is an 8-bit unsigned integer.

In an implementation, the decoding indication information of each point cloud frame further includes one or more pieces of point cloud slice data, each piece of point cloud slice data includes a point cloud attribute slice, the point cloud attribute slice includes an attribute slice header (attribute_slice_header), and the attribute slice header includes an attribute identifier field. Each point cloud attribute slice may be indexed to a corresponding attribute header through a value of the attribute identifier field in the attribute slice header.

Each attribute header corresponds to one or more point cloud attribute slices, and a value of the attribute identifier field in each attribute header matches a value of the attribute identifier field in a point cloud attribute slice corresponding to the attribute header. That is, the content consumption device may determine, based on the value of the attribute identifier field in the attribute header, one or more point cloud attribute slices corresponding to the attribute header. For specific indication manners of the attribute header and the attribute slice header, reference may be made to Table 8 and Table 9.

In an implementation, the stream data of each point cloud frame includes an attribute data bitstream (general_attribute_data_bitstream), and the attribute data bitstream includes an attribute identifier field.

A number of values of the attribute identifier field in the attribute header is N, and N is a positive integer. The attribute header corresponds to M attribute data bitstreams, and M is an integer greater than or equal to N. The value of the attribute identifier field in the attribute header matches a value of the attribute identifier field in the attribute data bitstream. That is, the content consumption device may determine, based on a current value of the attribute identifier field in the attribute header, a value of at least one attribute identifier field in the stream data of each point cloud frame and an attribute data bitstream matching the current value of the attribute identifier field in the attribute header. For specific indication manners of the attribute header and the attribute bitstream, reference may be made to Table 10 and Table 11.

In an implementation, the stream data of each point cloud frame includes one or more types of attribute data; each type of attribute data includes one or more groups of data instances; and values of attribute identifier fields corresponding to various groups of data instances of each type of attribute data are different. For example, if the stream data of each point cloud frame includes two groups of different color data, a value of an attribute identifier field corresponding to each group of color data instances differs.

In an implementation, each attribute header further includes an attribute slice data type (attributeSliceDataType) field, the attribute slice data type field is used to indicate a type of attribute data indicated by the attribute identifier field, and a value of the attribute slice data type field is a 4-bit unsigned integer.

Specifically, in a case that the value of the attribute slice data type field is a first specified value (for example, attributeSliceDataType=0), the attribute slice data type field is used to indicate that the attribute data indicated by the attribute identifier field is attribute data of a color type; in a case that the value of the attribute slice data type field is a second specified value (for example, attributeSliceDataType=1), the attribute slice data type field is used to indicate that the attribute data indicated by the attribute identifier field is attribute data of a reflectivity type; or in a case that the value of the attribute slice data type field is a third specified value (for example, attributeSliceDataType=2), the attribute slice data type field is used to indicate that the attribute data indicated by the attribute identifier field includes attribute data of a color type and attribute data of a reflectivity type. In addition, in a case that the value of the attribute slice data type field is the third specified value (for example, attributeSliceDataType=2), it indicates that switching among attribute data of different types during attribute prediction is allowed. For example, switching is performed between the attribute data of the color type and the attribute data of the reflectivity type.

In an implementation, the stream data may include one or more groups of data instances of the attribute data. The media file further includes a sequence header (sequence_header), and the sequence header is used to indicate a number of groups of data instances of attribute data included in the stream data, an attribute identifier field corresponding to each group of data instances, and an attribute slice data type field corresponding to each group of data instances.

In an implementation, the content consumption device obtains all component tracks of the point cloud media, where values of attribute identifier fields corresponding to attribute data encapsulated in different attribute component tracks are different, and the content consumption device determines attribute component tracks required for decoding based on the decoding indication information of each point cloud frame and an application form of each point cloud frame or a decoding capability of the content consumption device. After the attribute component tracks required for decoding are obtained, the content consumption device performs decapsulation on the attribute component tracks to obtain required stream data.

In another implementation, the content consumption device obtains a transmission signaling file of the point cloud media, determines a media file required for presenting the point cloud media based on description information in the transmission signaling file and an application form of each point cloud frame, or a decoding capability of the content consumption device, or a current network condition (for example, a network transmission speed), and pulls the determined media file of the point cloud media in a streaming transmission manner. The media file includes attribute component tracks required for decoding, and the content consumption device performs decapsulation on the attribute component tracks to obtain required stream data.

S202. Present the point cloud media based on the stream data and the decoding indication information.

The content consumption device performs decoding on the stream data of each point cloud frame based on the decoding indication information of each point cloud frame, to present the point cloud media. The decoding process at the content consumption device end and an encoding process at a content production device end are reverse. The content consumption device performs decoding on an encoded bitstream based on the decoding indication information, to restore point cloud data. The content consumption device performs rendering on the obtained point cloud data based on metadata related to render and window in media presentation description information, to obtain a point cloud frame of the point cloud media, and presents the point cloud media based on presentation time of the point cloud frame. For an exemplary implementation in which the content consumption device performs decoding on the media file to present the point cloud media, reference may be made to the implementation of decoding and presentation of the point cloud media in FIG. 1d.

In this embodiment of this disclosure, a media file of a point cloud media is obtained, where the media file includes stream data of each point cloud frame and decoding indication information of each point cloud frame, the decoding indication information of each point cloud frame includes at least two attribute headers, and each attribute header includes an attribute identifier field; and the point cloud media is presented based on the stream data and the decoding indication information. It may be recognized that, attribute data of each point cloud frame can be distinguished through the attribute identifier field and is indicated by using at least two attribute headers. In addition, a type of the attribute data is further distinguished through the attribute slice data type field, so that a decoding indication manner of the point cloud media is enriched, and the content consumption device may flexibly select the required media file of the point cloud media based on a requirement to perform transmission and decoding consumption.

Figure 3:
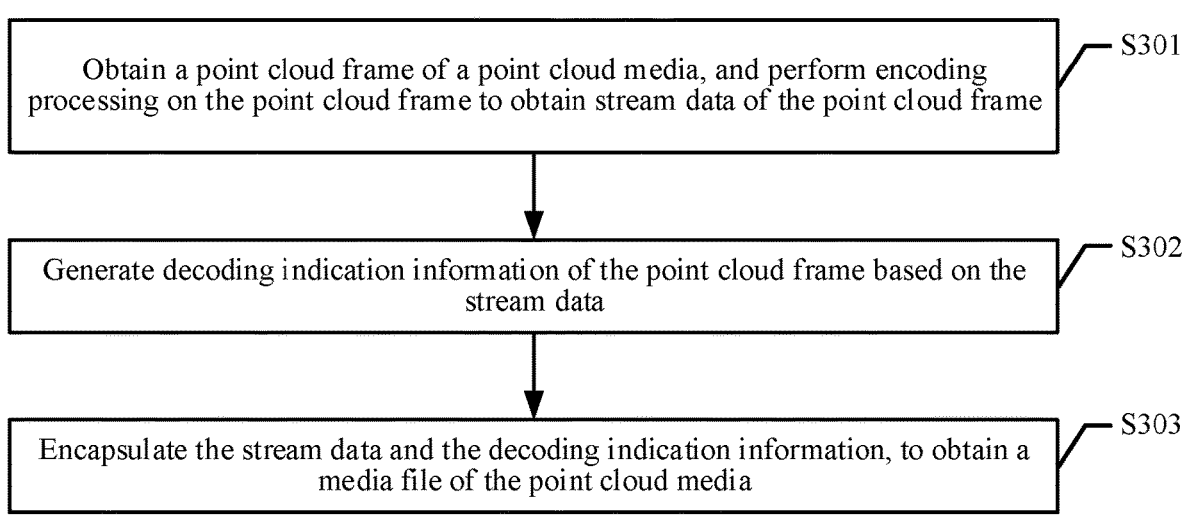
FIG. 3 is a flowchart of another data processing method for a point cloud media according to an embodiment of this disclosure.

FIG. 3 is a flowchart of another data processing method for a point cloud media according to an embodiment of this disclosure. The method may be performed by a content production device in a point cloud media system, and the method includes the following step S301 to step S303:

S301. Obtain a point cloud frame of the point cloud media, and perform encoding processing on the point cloud frame to obtain stream data of the point cloud frame.

The stream data may include one or more groups of data instances of attribute data. For an exemplary implementation of step S301, reference may be made to the implementation of obtaining the media content of the point cloud media and encoding the media content of the point cloud media in FIG. 1d, and details are not described herein again.

S302. Generate decoding indication information of the point cloud frame based on the stream data.

The decoding indication information of each point cloud frame includes at least two attribute headers (attribute_header), and each attribute header includes an attribute identifier field. The field is used to indicate attribute data of each point cloud frame, values of attribute identifier fields corresponding to various groups of data instances of attribute data of each type of each point cloud frame are different (that is, one group of data instances of attribute data of each type correspond to one unique attribute data identifier), and a value of the attribute identifier field is an 8-bit unsigned integer.

In an implementation, the content production device generates a sequence header (sequence_header) based on the stream data of the point cloud frame, where the sequence header indicates a number of groups of data instances of attribute data included in the stream data, an attribute identifier field corresponding to each group of data instances, and an attribute slice data type field corresponding to each group of data instances. After obtaining the sequence header, the content production device generates the decoding indication information of the point cloud frame based on the sequence header.

In an implementation, the decoding indication information of each point cloud frame further includes one or more pieces of point cloud slice data, each piece of point cloud slice data includes a point cloud attribute slice, the point cloud attribute slice includes an attribute slice header (attribute_slice_header), and the attribute slice header includes an attribute identifier field. Each point cloud attribute slice may be indexed to a corresponding attribute header through a value of the attribute identifier field in the attribute slice header.

Each attribute header corresponds to one or more point cloud attribute slices, and a value of the attribute identifier field in each attribute header matches a value of the attribute identifier field in a point cloud attribute slice corresponding to the attribute header. That is, a content consumption device may determine, based on the value of the attribute identifier field in the attribute header, one or more point cloud attribute slices corresponding to the attribute header. For specific indication manners of the attribute header and the attribute slice header, reference may be made to Table 8 and Table 9.

In an implementation, the stream data of each point cloud frame includes an attribute data bitstream (general_attribute_data_bitstream), and the attribute data bitstream includes an attribute identifier field.

A number of values of the attribute identifier field in the attribute header is N, and N is a positive integer. The attribute header corresponds to M attribute data bitstreams, and M is an integer greater than or equal to N. The value of the attribute identifier field in the attribute header matches a value of the attribute identifier field in the attribute data bitstream. That is, the content consumption device may determine, based on a current value of the attribute identifier field in the attribute header, a value of at least one attribute identifier field in the stream data of each point cloud frame and an attribute data bitstream matching the current value of the attribute identifier field in the attribute header. For specific indication manners of the attribute header and the attribute bitstream, reference may be made to Table 10 and Table 11.

In an implementation, the stream data of each point cloud frame includes one or more types of attribute data; each type of attribute data includes one or more groups of data instances; and values of attribute identifier fields corresponding to various groups of data instances of each type of attribute data are different. For example, if the stream data of each point cloud frame includes two groups of different color data, a value of an attribute identifier field corresponding to each group of color data instances differs.

In an implementation, each attribute header further includes an attribute slice data type (attributeSliceDataType) field, the attribute slice data type field is used to indicate a type of attribute data indicated by the attribute identifier field, and a value of the attribute slice data type field is a 4-bit unsigned integer.

Specifically, in a case that the value of the attribute slice data type field is a first specified value (for example, attributeSliceDataType=0), the attribute slice data type field is used to indicate that the attribute data indicated by the attribute identifier field is attribute data of a color type; in a case that the value of the attribute slice data type field is a second specified value (for example, attributeSliceDataType=1), the attribute slice data type field is used to indicate that the attribute data indicated by the attribute identifier field is attribute data of a reflectivity type; or in a case that the value of the attribute slice data type field is a third specified value (for example, attributeSliceDataType=2), the attribute slice data type field is used to indicate that the attribute data indicated by the attribute identifier field includes attribute data of a color type and attribute data of a reflectivity type. In addition, in a case that the value of the attribute slice data type field is the third specified value (for example, attributeSliceDataType=2), it indicates that switching among attribute data of different types during attribute prediction is allowed. For example, switching is performed between the attribute data of the color type and the attribute data of the reflectivity type.

S303. Encapsulate the stream data and the decoding indication information, to obtain a media file of the point cloud media.

In an implementation, the content production device encapsulates the sequence header, the stream data, and the decoding indication information, to obtain the media file of the point cloud media.

In an example, after obtaining the media file of the point cloud media, the content production device performs slicing on the media file to obtain a plurality of media segments; and generates a transmission signaling file of the media file, where the transmission signaling file is used to describe point cloud data encapsulated in each track. Therefore, the content production device may flexibly select, based on the description of the transmission signaling file and a requirement of the content production device, the required media file of the point cloud media to perform transmission and decoding consumption.

The following describes the data processing method for a point cloud media provided in this disclosure by using a complete example:

A content production device defines the following high-level syntax information based on geometric information and attribute data included in stream data of each point cloud frame.

(a) The content production device indicates, in a sequence header, a number of groups of data instances of the attribute data included in the stream data of each point cloud frame, an attribute identifier field corresponding to each group of data instances, and an attribute slice data type field corresponding to each group of data instances. The following information is included:

maxNumAttributesMinus1=1;
  {attributeIdentifier=0; attributeSliceDataType=0}
  {attributeIdentifier=1; attributeSliceDataType=0} maxNumAttributesMinus1=1 indicates that a maximum number of attribute encoding supported by the current stream data is 2 (that is, the current stream data includes two groups of data instances). {attributeIdentifier=0; attributeSliceDataType=0} indicates that an attribute identifier corresponding to one group of data instances in the current stream data is 0, and a type of the group of data instances is a color type. {attributeIdentifier=1; attributeSliceDataType=0} indicates that an attribute identifier corresponding to the other group of data instances in the current stream data is 1, and a type of the group of data instances is a color type.

(b) The content production device defines, based on the information in the sequence header, a geometry header (parameter set) and at least two attribute headers (parameter sets) required for decoding each point cloud frame. The stream data of each point cloud frame includes two attribute headers, and a value of an attribute identifier (attributeIdentifier) field and a value of an attribute slice data type (attributeSliceDataType) field in each attribute header are in a one-to-one correspondence with the information in the sequence header.

(c) The content production device defines, based on the information in the sequence header, a corresponding point cloud geometry slice and corresponding point cloud attribute slices, where each point cloud attribute slice is indexed to a corresponding attribute header (parameter set) through an attributeIdentifier field in a slice header of the point cloud attribute slice.

The content production device then encapsulates the stream data of each point cloud frame into three file tracks based on the high-level syntax information, where the three file tracks include one geometry component track and two attribute component tracks, and the two attribute component tracks respectively correspond to the two groups of data instances whose attribute identifiers are 0 and 1.

In an implementation, the content production device transmits all the component tracks of the point cloud media to a content consumption device; and after obtaining all the component tracks of the point cloud media, the content consumption device partially decodes the required attribute component tracks based on a decoding capability of the content consumption device or an application form of the point cloud media.

In another implementation, the content production device generates MPD signaling of the point cloud media and transmits the MPD signaling to the content consumption device; and after receiving the MPD signaling of the point cloud media, the content consumption device requests, based on a transmission bandwidth, a decoding capability of the content consumption device, or an application form of the point cloud media, a geometry component track and a specific attribute component track, and partially transmits and decodes the required attribute component track.

In this embodiment of this disclosure, a point cloud frame of a point cloud media is obtained, and encoding processing is performed on the point cloud frame to obtain stream data of the point cloud frame; decoding indication information of the point cloud frame is generated based on the stream data, where the decoding indication information of each point cloud frame includes at least two attribute headers, and each attribute header includes an attribute identifier field; and the stream data and the decoding indication information are encapsulated, to obtain a media file of the point cloud media. It may be recognized that, through the attribute identifier field, the attribute data of the point cloud frame can be distinguished and indicated by using at least two attribute headers. In addition, a type of the attribute data is further distinguished through the attribute slice data type field, so that a decoding indication manner of the point cloud media is enriched, and the content consumption device may flexibly select the required media file of the point cloud media based on a requirement to perform transmission and decoding consumption.

It is to be understood that, although the steps are displayed sequentially according to the indications of the arrows in the flowcharts of the embodiments, these steps are not necessarily performed sequentially according to the sequence indicated by the arrows. Unless otherwise clearly specified in this specification, the steps are performed without any strict sequence limit, and may be performed in other sequences. In addition, at least some steps in the flowcharts of the foregoing embodiments may include a plurality of steps or a plurality of stages. The steps or the stages are not necessarily performed at the same moment, but may be performed at different moments. The steps or the stages are not necessarily performed sequentially, but may be performed in turn or alternately with another step or at least some of steps or stages of the another step.

The method in the embodiments of this disclosure is described in detail above. For ease of better implementing the foregoing solutions in the embodiments of this disclosure, an apparatus in an embodiment of this disclosure is correspondingly provided in the following.

Figure 4:
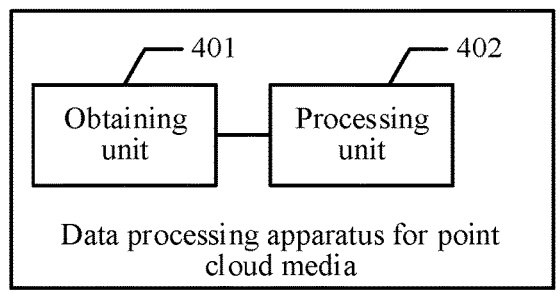
FIG. 4 is a schematic structural diagram of a data processing apparatus for a point cloud media according to an embodiment of this disclosure.

FIG. 4 is a schematic structural diagram of a data processing apparatus for a point cloud media according to an embodiment of this disclosure. The data processing apparatus for a point cloud media may be a computer program (including program code) running in a content consumption device. For example, the data processing apparatus for a point cloud media may be application software in the content consumption device. As shown in FIG. 4, the data processing apparatus for a point cloud media includes an obtaining unit 401 and a processing unit 402.

Referring to FIG. 4, in an exemplary embodiment, detailed description of the units are as follows:

The obtaining unit 401 is configured to obtain a media file of the point cloud media, where the media file includes stream data of each point cloud frame and decoding indication information of each point cloud frame, the decoding indication information of each point cloud frame includes at least two attribute headers, and each attribute header includes an attribute identifier field.

The processing unit 402 is configured to present the point cloud media based on the stream data and the decoding indication information.

In an implementation, the decoding indication information of each point cloud frame further includes one or more pieces of point cloud slice data, each piece of point cloud slice data includes a point cloud attribute slice, the point cloud attribute slice includes an attribute slice header, and the attribute slice header includes an attribute identifier field.

In an implementation, each attribute header corresponds to one or more point cloud attribute slices, and a value of the attribute identifier field in each attribute header matches a value of the attribute identifier field in a point cloud attribute slice corresponding to the attribute header.

In an implementation, the stream data of each point cloud frame includes an attribute data bitstream, and the attribute data bitstream includes an attribute identifier field.

In an implementation, the value of the attribute identifier field in the attribute header matches a value of the attribute identifier field in the attribute data bitstream.

In an implementation, the stream data of each point cloud frame includes one or more types of attribute data; each type of attribute data includes one or more groups of data instances; and values of attribute identifier fields corresponding to different data instances are different.

In an implementation, each attribute header further includes an attribute slice data type field, and the attribute slice data type field is used to indicate a type of attribute data indicated by the attribute identifier field.

In an implementation, in a case that a value of the attribute slice data type field is a first specified value, the attribute slice data type field is used to indicate that the attribute data indicated by the attribute identifier field is attribute data of a color type;

in a case that a value of the attribute slice data type field is a second specified value, the attribute slice data type field is used to indicate that the attribute data indicated by the attribute identifier field is attribute data of a reflectivity type; or in a case that a value of the attribute slice data type field is a third specified value, the attribute slice data type field is used to indicate that the attribute data indicated by the attribute identifier field includes attribute data of a color type and attribute data of a reflectivity type.

In an implementation, in a case that the value of the attribute slice data type field is the third specified value, switching among attribute data of different types during attribute prediction is allowed.

In an implementation, the media file further includes a sequence header, and the sequence header is used to indicate a number of groups of data instances of attribute data included in the stream data, an attribute identifier field corresponding to each group of data instances, and an attribute slice data type field corresponding to each group of data instances.

In an implementation, the obtaining unit 401 is further configured to:

obtain a transmission signaling file of the point cloud media, where the transmission signaling file includes description information of the point cloud media;

determine, based on the description information of the point cloud media, the media file required for presenting the point cloud media; and pull the determined media file of the point cloud media in a streaming transmission manner.

According to an embodiment of this disclosure, some steps involved in the data processing method for a point cloud media shown in FIG. 2 may be performed by the units in the data processing apparatus for a point cloud media shown in FIG. 4. For example, step S201 shown in FIG. 2 may be performed by the obtaining unit 401 shown in FIG. 4, and step S202 may be performed by the processing unit 402 shown in FIG. 4. The units in the data processing apparatus for a point cloud media shown in FIG. 4 may be separately or wholly combined into one or several other units, or one (or more) of the units herein may further be divided into a plurality of units of smaller functions. In this way, same operations can be implemented, and implementation of the technical effects of the embodiments of this disclosure is not affected. The foregoing units are divided based on logical functions. During actual application, a function of one unit may be implemented by a plurality of units, or functions of a plurality of units are implemented by one unit. In other embodiments of this disclosure, the data processing apparatus for a point cloud media may also include other units. During actual application, the functions may also be cooperatively implemented by other units and may be cooperatively implemented by a plurality of units.

According to another embodiment of this disclosure, a computer program (including program code) that can perform the steps in the corresponding method shown in FIG. 2 may run on a general computing device, such as a computer, which includes processing elements and storage elements such as a central processing unit (CPU), a random access memory (RAM), and a read-only memory (ROM), to construct the data processing apparatus for a point cloud media shown in FIG. 4, and implement the data processing method for a point cloud media in the embodiments of this disclosure. The computer program may be recorded in, for example, a computer-readable recording medium, such as a non-transitory computer-readable storage medium, and may be loaded into the foregoing computing device by using the computer-readable recording medium, and run in the computing device.

Based on a similar concept, the principle for the data processing apparatus for a point cloud media provided in this embodiment of this disclosure to resolve the problems and beneficial effects thereof are similar to the principle for the data processing method for a point cloud media in the method embodiments of this disclosure to resolve the problems and the beneficial effects thereof. Therefore, for the principle and the beneficial effects, reference may be made to the principle and the beneficial effects of implementations of the method.

Figure 5:
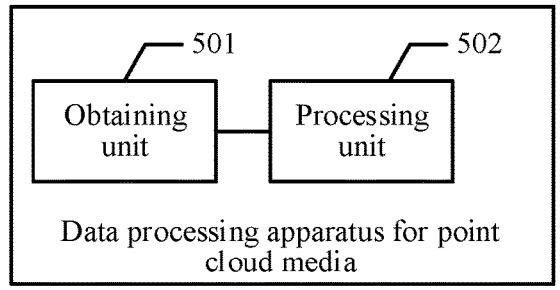
FIG. 5 is a schematic structural diagram of another data processing apparatus for a point cloud media according to an embodiment of this disclosure.

FIG. 5 is a schematic structural diagram of another data processing apparatus for a point cloud media according to an embodiment of this disclosure. The data processing apparatus for a point cloud media may be a computer program (including program code) running in a content production device. For example, the data processing apparatus for a point cloud media may be application software in the content production device. As shown in FIG. 5, the data processing apparatus for a point cloud media includes an obtaining unit 501 and a processing unit 502. Referring to FIG. 5, detailed description of the units are as follows:

The obtaining unit 501 is configured to obtain a point cloud frame of the point cloud media, and perform encoding processing on the point cloud frame to obtain stream data of the point cloud frame.

The processing unit 502 is configured to: generate decoding indication information of the point cloud frame based on the stream data, where the decoding indication information of each point cloud frame includes at least two attribute headers, and each attribute header includes an attribute identifier field; and encapsulate the stream data and the decoding indication information, to obtain a media file of the point cloud media.

In an implementation, the processing unit 502 is configured to generate decoding indication information of the point cloud frame based on the stream data, and is specifically configured to:

generate a sequence header based on the stream data, where the sequence header is used to indicate a number of groups of data instances of attribute data included in the stream data, an attribute identifier field corresponding to each group of data instances, and an attribute slice data type field corresponding to each group of data instances; and generate the decoding indication information of the point cloud frame based on the sequence header, where the decoding indication information of each point cloud frame further includes one or more pieces of point cloud slice data, each piece of point cloud slice data includes a point cloud attribute slice, and the point cloud attribute slice includes an attribute identifier field.

In an implementation, the processing unit 502 is configured to encapsulate the stream data and the decoding indication information, to obtain a media file of the point cloud media, and is specifically configured to:

encapsulate the sequence header, the stream data, and the decoding indication information, to obtain the media file of the point cloud media.

In an implementation, the processing unit 502 is further configured to:

perform slicing on the media file to obtain a plurality of media segments; and generate a transmission signaling file of the media file.

According to an embodiment of this disclosure, some steps involved in the data processing method for a point cloud media shown in FIG. 3 may be performed by the units in the data processing apparatus for a point cloud media shown in FIG. 5. For example, step S301 shown in FIG. 3 may be performed by the obtaining unit 501 shown in FIG. 5, and step S302 and step S303 may be performed by the processing unit 502 shown in FIG. 5. The units in the data processing apparatus for a point cloud media shown in FIG. 5 may be separately or wholly combined into one or several other units, or one (or more) of the units herein may further be divided into a plurality of units of smaller functions. In this way, same operations can be implemented, and implementation of the technical effects of the embodiments of this disclosure is not affected. The foregoing units are divided based on logical functions. During actual application, a function of one unit may be implemented by a plurality of units, or functions of a plurality of units are implemented by one unit. In other embodiments of this disclosure, the data processing apparatus for a point cloud media may also include other units. During actual application, the functions may also be cooperatively implemented by other units and may be cooperatively implemented by a plurality of units.

According to another embodiment of this disclosure, a computer program (including program code) that can perform the steps in the corresponding method shown in FIG. 3 may run on a general computing device, such as a computer, which includes processing elements and storage elements such as a central processing unit (CPU), a random access memory (RAM), and a read-only memory (ROM), to construct the data processing apparatus for a point cloud media shown in FIG. 5, and implement the data processing method for a point cloud media in the embodiments of this disclosure. The computer program may be recorded in, for example, a computer-readable recording medium, such as a non-transitory computer-readable storage medium, and may be loaded into the foregoing computing device by using the computer-readable recording medium, and run in the computing device.

Based on a similar concept, the principle for the data processing apparatus for a point cloud media provided in this embodiment of this disclosure to resolve the problems and beneficial effects thereof are similar to the principle for the data processing method for a point cloud media in the method embodiments of this disclosure to resolve the problems and the beneficial effects thereof. Therefore, for the principle and the beneficial effects, reference may be made to the principle and the beneficial effects of implementations of the method.

Figure 6:
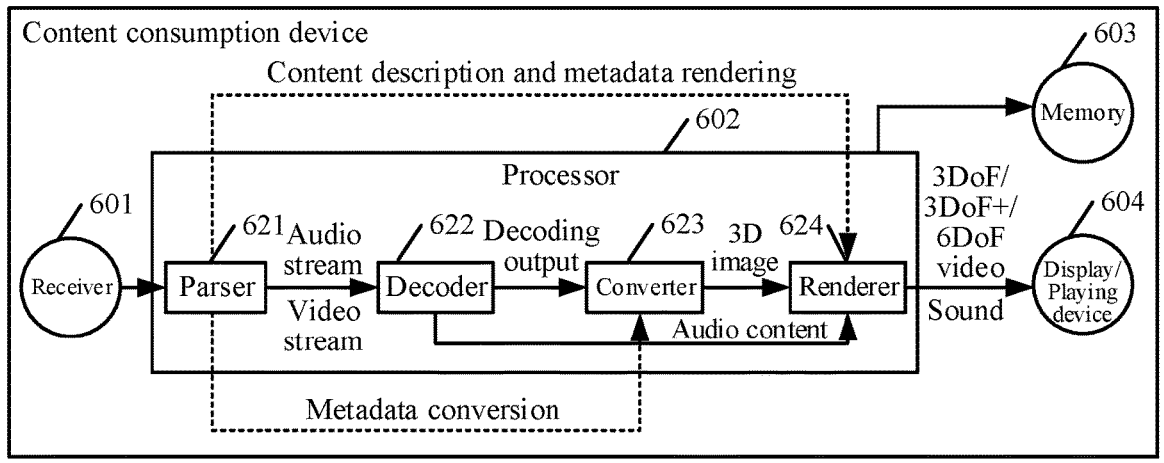
FIG. 6 is a schematic structural diagram of a content consumption device according to an embodiment of this disclosure.

FIG. 6 is a schematic structural diagram of a content consumption device according to an embodiment of this disclosure. The content consumption device may be a computer device used by a user of a point cloud media, and the computer device may be a terminal (for example, a PC, a smart mobile device (such as a smartphone), and a VR device (such as a VR helmet or VR glasses)). As shown in FIG. 6, the content consumption device includes a receiver 601, a processor 602, a memory 603, and a display/playing device 604.

The receiver 601 is configured to implement transmission interaction between the content consumption device and another device, and is specifically configured to implement point cloud media transmission between a content production device and the content consumption device. That is, the content consumption device receives, through the receiver 601, related media resources of the point cloud media transmitted by the content production device.

The processor 602 (or referred to as a central processing unit (CPU)) is a processing core of the content consumption device. The processor 602 is suitable for implementing one or more program instructions, and is specifically suitable for loading and executing one or more program instructions to implement the procedure of the data processing method for a point cloud media shown in FIG. 2.

The memory 603 is a memory device of the content consumption device, and is configured to store a program and media resources. It may be understood that the memory 603 herein may include an internal storage medium of the content consumption device and certainly may also include an extended storage medium supported by the content consumption device. The memory 603 may be a high-speed RAM, or may be a non-volatile memory, for example, at least one magnetic disk memory. In an example, the memory may alternatively be at least one memory far away from the foregoing processor. The memory 603 provides a storage space, and the storage space is used for storing an operating system of the content consumption device. In addition, the storage space is further used for storing a computer program, where the computer program includes program instructions, and the program instructions are suitable for being invoked and executed by the processor, to implement the steps of the data processing method for a point cloud media. In addition, the memory 603 may be further configured to store a three-dimensional image of the point cloud media that is formed after processing by the processor, audio content corresponding to the three-dimensional image, and information required for rendering the three-dimensional image and the audio content.

The display/playing device 604 is configured to output sound obtained through rendering and the three-dimensional image.

Still referring to FIG. 6, the processor 602 may include a parser 621, a decoder 622, a converter 623, and a renderer 624.

The parser 621 is configured to perform file decapsulation on an encapsulated file of a rendered media from the content production device, and is specifically configured to perform decapsulation on a media file resource based on a file format requirement of the point cloud media, to obtain an audio stream and a video stream; and provide the audio stream and the video stream to the decoder 622.

The decoder 622 performs audio decoding on the audio stream, to obtain audio content and provide the audio content to the renderer for audio rendering. In addition, the decoder 622 performs decoding on the video stream to obtain a 2D image. According to metadata provided by media presentation description information, if the metadata indicates that the point cloud media has performed a region encapsulation process, the 2D image is an encapsulated image; and if the metadata indicates that the point cloud media has not performed the region encapsulation process, the 2D image is a projected image.

The converter 623 is configured to convert the 2D image into a 3D image. If the point cloud media has performed the region encapsulation process, the converter 623 first performs region decapsulation on the encapsulated image to obtain the projected image; and then performs reconstruction on the projected image to obtain the 3D image. If the point cloud media has not performed the region encapsulation process, the converter 623 directly performs reconstruction on the projected image to obtain the 3D image.

The renderer 624 is configured to perform rendering on the audio content and the 3D image of the point cloud media. Specifically, the renderer performs rendering on the audio content and the 3D image based on metadata related to render and window in the media presentation description information, and the audio content and the 3D image are outputted by the display/playing device after the rendering is completed.

In an exemplary embodiment, the processor 602 (specifically, components included in the processor) invokes one or more computer instructions in the memory to perform the steps of the data processing method for a point cloud media shown in FIG. 2. Specifically, the memory stores one or more first computer instructions, and the one or more first computer instructions are suitable for being loaded by the processor 602 to perform the following steps:

obtaining a media file of the point cloud media, where the media file includes stream data of each point cloud frame and decoding indication information of each point cloud frame, the decoding indication information of each point cloud frame includes at least two attribute headers, and each attribute header includes an attribute identifier field; and presenting the point cloud media based on the stream data and the decoding indication information.

In an implementation, the decoding indication information of each point cloud frame further includes one or more pieces of point cloud slice data, each piece of point cloud slice data includes a point cloud attribute slice, the point cloud attribute slice includes an attribute slice header, and the attribute slice header includes an attribute identifier field.

In an implementation, each attribute header corresponds to one or more point cloud attribute slices, and a value of the attribute identifier field in each attribute header matches a value of the attribute identifier field in a point cloud attribute slice corresponding to the attribute header.

In an implementation, the stream data of each point cloud frame includes an attribute data bitstream, and the attribute data bitstream includes an attribute identifier field.

In an implementation, the value of the attribute identifier field in the attribute header matches a value of the attribute identifier field in the attribute data bitstream.

In an implementation, the stream data of each point cloud frame includes one or more types of attribute data; each type of attribute data includes one or more groups of data instances; and values of attribute identifier fields corresponding to different data instances are different.

In an implementation, each attribute header further includes an attribute slice data type field, and the attribute slice data type field is used to indicate a type of attribute data indicated by the attribute identifier field.

In an implementation, in a case that a value of the attribute slice data type field is a first specified value, the attribute slice data type field is used to indicate that the attribute data indicated by the attribute identifier field is attribute data of a color type;

in a case that a value of the attribute slice data type field is a second specified value, the attribute slice data type field is used to indicate that the attribute data indicated by the attribute identifier field is attribute data of a reflectivity type; or in a case that a value of the attribute slice data type field is a third specified value, the attribute slice data type field is used to indicate that the attribute data indicated by the attribute identifier field includes attribute data of a color type and attribute data of a reflectivity type.

In an implementation, in a case that the value of the attribute slice data type field is the third specified value, switching among attribute data of different types during attribute prediction is allowed.

In an implementation, the media file further includes a sequence header, and the sequence header is used to indicate a number of groups of data instances of attribute data included in the stream data, an attribute identifier field corresponding to each group of data instances, and an attribute slice data type field corresponding to each group of data instances.

In an implementation, the computer program in the memory 603 is loaded by the processor 602 to perform the following steps:

obtaining a transmission signaling file of the point cloud media, where the transmission signaling file includes description information of the point cloud media;

determining, based on the description information of the point cloud media, the media file required for presenting the point cloud media; and pulling the determined media file of the point cloud media in a streaming transmission manner.

Based on a similar concept, the principle for the content consumption device provided in this embodiment of this disclosure to resolve the problems and beneficial effects thereof are similar to the principle for the data processing method for a point cloud media in the method embodiments of this disclosure to resolve the problems and the beneficial effects thereof. Therefore, for the principle and the beneficial effects, reference may be made to the principle and the beneficial effects of implementations of the method.

Figure 7:
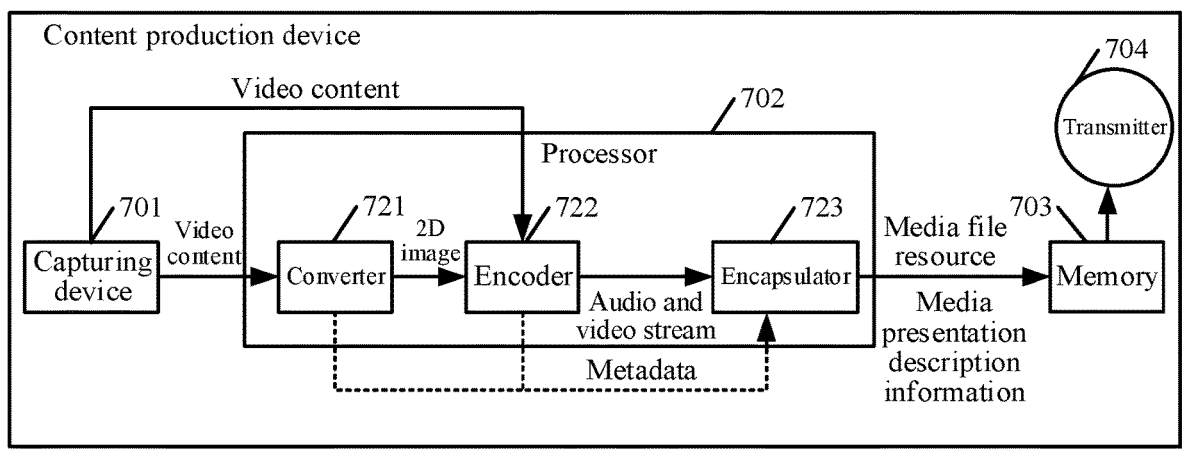
FIG. 7 is a schematic structural diagram of a content production device according to an embodiment of this disclosure.

FIG. 7 is a schematic structural diagram of a content production device according to an embodiment of this disclosure. The content production device may be a computer device used by a provider of a point cloud media, and the computer device may be a terminal (for example, a PC, a smart mobile device (such as a smartphone), and the like) or a server. As shown in FIG. 7, the content production device includes a capturing device 701, a processor 702, a memory 703, and a transmitter 704.

The capturing device 701 is configured to collect a sound-visual scenario in a real world to obtain original data (including audio content and video content that are synchronized in time and space) of the point cloud media. The capturing device 701 may include, but not limited to: an audio device, a photographing device, and a sensing device. The audio device may include an audio sensor and a microphone. The photographing device may include a common camera, a three-dimensional camera, and an optical field camera. The sensing device may include a laser device and a radar device.

The processor 702 (or referred to as a central processing unit (CPU)) is a processing core of the content production device. The processor 702 is suitable for implementing one or more program instructions, and is specifically suitable for loading and executing one or more program instructions to implement the procedure of the data processing method for a point cloud media shown in FIG. 3.

The memory 703 is a memory device of the content production device, and is configured to store a program and media resources. It may be understood that the memory 703 herein may include an internal storage medium of the content production device and certainly may also include an extended storage medium supported by the content production device. The memory may be a high-speed RAM, or may be a non-volatile memory, for example, at least one magnetic disk memory. In an example, the memory may alternatively be at least one memory far away from the foregoing processor. The memory provides a storage space, and the storage space is used for storing an operating system of the content production device. In addition, the storage space is further used for storing computer-readable instructions, where the computer-readable instructions include program instructions, and the program instructions are suitable for being invoked and executed by the processor, to implement the steps of the data processing method for a point cloud media. In addition, the memory 703 may be further configured to store a point cloud media file formed after processing by the processor, where the point cloud media file includes a media file resource and media presentation description information.

The transmitter 704 is configured to implement transmission interaction between the content production device and another device, and is specifically configured to implement point cloud media transmission between the content production device and a content playing device. That is, the content production device transmits, through the transmitter 704, related media resources of the point cloud media to the content playing device.

Still referring to FIG. 7, the processor 702 may include a converter 721, an encoder 722, and an encapsulator 723.

The converter 721 is configured to perform a series of conversion processing on the captured video content, so that the video content becomes content on which video encoding of the point cloud media is suitable for being performed. The conversion processing may include: splicing and projection. In an example, the conversion processing further includes region encapsulation. The converter 721 may convert captured 3D video content into a 2D image, and provide the 2D image to the encoder for video encoding.

The encoder 722 is configured to perform audio encoding on the captured audio content to form an audio stream of the point cloud media. The encoder is further configured to perform video encoding on the 2D image obtained through conversion by the converter 721, to obtain a video stream.

The encapsulator 723 is configured to: encapsulate the audio stream and the video stream into a file container based on a file format (for example, ISOBMFF) of the point cloud media, to form the media file resource of the point cloud media, where the media file resource may be a media file or a media segment for forming the media file of the point cloud media; and record, based on the file format of the point cloud media, metadata of the media file resource of the point cloud media by using the media presentation description information. An encapsulated file of the point cloud media obtained through processing by the encapsulator is stored in the memory and provided to the content playing device as required to represent the point cloud media.

The processor 702 (specifically, components included in the processor) invokes one or more computer-readable instructions in the memory to perform the steps of the data processing method for a point cloud media shown in FIG. 4. Specifically, the memory 703 stores one or more first computer-readable instructions, and the one or more first computer-readable instructions are suitable for being loaded by the processor 702 to perform the following steps:

obtaining a point cloud frame of the point cloud media, and performing encoding processing on the point cloud frame to obtain stream data of the point cloud frame;

generating decoding indication information of the point cloud frame based on the stream data, where the decoding indication information of each point cloud frame includes at least two attribute headers, and each attribute header includes an attribute identifier field; and encapsulating the stream data and the decoding indication information, to obtain a media file of the point cloud media.

In an implementation, a specific embodiment that the processor 702 generates the decoding indication information of the point cloud frame based on the stream data is as follows:

generating a sequence header based on the stream data, where the sequence header is used to indicate a number of groups of data instances of attribute data included in the stream data, an attribute identifier field corresponding to each group of data instances, and an attribute slice data type field corresponding to each group of data instances; and generating the decoding indication information of the point cloud frame based on the sequence header, where the decoding indication information of each point cloud frame further includes one or more pieces of point cloud slice data, each piece of point cloud slice data includes a point cloud attribute slice, and the point cloud attribute slice includes an attribute identifier field.

In an implementation, a specific embodiment that the processor 702 encapsulates the stream data and the decoding indication information, to obtain the media file of the point cloud media is as follows:

encapsulating the sequence header, the stream data, and the decoding indication information, to obtain the media file of the point cloud media.

In an implementation, a computer program in the memory 703 is loaded by the processor 702 to perform the following steps:

performing slicing on the media file to obtain a plurality of media segments; and generating a transmission signaling file of the media file.

Based on a similar concept, the principle for the content production device provided in this embodiment of this disclosure to resolve the problems and beneficial effects thereof are similar to the principle for the data processing method for a point cloud media in the method embodiments of this disclosure to resolve the problems and the beneficial effects thereof. Therefore, for the principle and the beneficial effects, reference may be made to the principle and the beneficial effects of implementations of the method.

An embodiment of this disclosure further provides a computer-readable storage medium, storing one or more computer-readable instructions, where the one or more computer-readable instructions are suitable for being loaded by a processor to implement the data processing method for a point cloud media according to the foregoing method embodiments.

An embodiment of this disclosure further provides a computer program product including computer-readable instructions, where when the computer program product runs on a computer, the computer is caused to perform the data processing method for a point cloud media according to the foregoing method embodiments.

An embodiment of this disclosure further provides a computer program product or a computer program. The computer program product or computer program includes computer-readable instructions, and the computer-readable instructions are stored in a computer-readable storage medium. A processor of a computer device reads the computer-readable instructions from the computer-readable storage medium and executes the computer-readable instructions, so that the computer device performs the data processing method for a point cloud media described above.

A sequence of the steps of the methods in the embodiments of this disclosure may be adjusted, and the steps may also be combined or omitted based on an actual requirement.

The modules in the apparatus in the embodiments of this disclosure may be combined, divided, and omitted based on an actual requirement.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

A person of ordinary skill in the art may understand that all or some of the steps of the methods in the embodiments may be implemented by a program instructing relevant hardware. The program may be stored in a computer-readable storage medium, such as a non-transitory computer-readable storage medium. The readable storage medium may include a flash memory, a read-only memory (ROM), a random access memory (RAM), a magnetic disk, an optical disc, or the like.

The foregoing description is merely an exemplary embodiment of this disclosure, and is not intended to limit the scope of this disclosure. Other embodiments, including equivalent modifications, shall fall within the scope of this disclosure.

What is claimed is:

1. A data processing method for point cloud media, the method comprising:
obtaining a media file of the point cloud media, the media file including stream data of a plurality of point cloud frames and decoding indication information of each of the plurality of point cloud frames, the decoding indication information of each of the plurality of point cloud frames including at least two attribute headers, and each of the at least two attribute headers including attribute identifier information; and
processing the point cloud media based on the stream data and the decoding indication information;
wherein each attribute header includes attribute slice data type information indicating a type of attribute data indicated by the attribute identifier information;
wherein when a value of the attribute slice data type information is a first value, the attribute slice data type information indicates that the attribute data indicated by the attribute identifier information includes attribute data of a color type;
when the value of the attribute slice data type information is a second value, the attribute slice data type information indicates that the attribute data indicated by the attribute identifier information includes attribute data of a reflectivity type; and
when the value of the attribute slice data type information is a third value, the attribute slice data type information indicates that the attribute data indicated by the attribute identifier information includes the attribute data of the color type and the attribute data of the reflectivity type and that switching among attribute data of different types during attribute prediction is allowed.

2. The method according to claim 1, wherein the attribute identifier information indicates one of a plurality of attribute data types.

3. The method according to claim 1, wherein the decoding indication information of each of the plurality of point cloud frames includes point cloud slice data, each of the point cloud slice data corresponding to a point cloud attribute slice, the point cloud slice data including an attribute slice header, and the attribute slice header including the attribute identifier information.

4. The method according to claim 3, wherein each attribute header corresponds to one or more point cloud attribute slices, and a value of the attribute identifier information in each attribute header matches a value of the attribute identifier information in the point cloud attribute slice corresponding to the attribute header.

5. The method according to claim 1, wherein the stream data of the plurality of point cloud frames includes an attribute data bitstream, and the attribute data bitstream includes the attribute identifier information.

6. The method according to claim 5, wherein a value of the attribute identifier information in each attribute header matches a value of the attribute identifier information in the attribute data bitstream.

7. The method according to claim 1, wherein
the stream data of each of the plurality of point cloud frames includes one or more types of attribute data;
each of the one or more types of attribute data including one or more groups of data instances; and
values of the attribute identifier information corresponding to different groups of data instances are different.

8. The method according to claim 1, wherein the media file includes a sequence header, the sequence header indicating a number of groups of data instances of attribute data included in the stream data, the attribute identifier information corresponding to each of the groups of data instances, and attribute slice data type information corresponding to each of the groups of data instances.

9. The method according to claim 1, further comprising:
obtaining transmission signaling information of the point cloud media, wherein the transmission signaling information includes description information of the point cloud media;
determining, based on the description information of the point cloud media, the media file required to process the point cloud media; and
obtaining the determined media file of the point cloud media.

10. A data processing method for a point cloud media, the method comprising:
receiving a point cloud frame of the point cloud media;
encoding the point cloud frame to obtain stream data of the point cloud frame;
generating decoding indication information of the point cloud frame based on the stream data, the decoding indication information of the point cloud frame including at least two attribute headers, and each attribute header including attribute identifier information; and
encapsulating the stream data and the decoding indication information in a media file of the point cloud media; wherein
the generating the decoding indication information comprises:
generating a sequence header based on the stream data, the sequence header indicating a number of groups of data instances of attribute data included in the stream data, the attribute identifier information corresponding to each of the groups of data instances, and an attribute slice data type information corresponding to each of the groups of data instances, and
generating the decoding indication information of the point cloud frame based on the sequence header; and
the decoding indication information of the point cloud frame includes point cloud slice data, each of the point cloud slice data corresponding to a point cloud attribute slice, and the point cloud attribute slice data including the attribute identifier information.

11. The method according to claim 10, wherein the attribute identifier information indicates one of a plurality of attribute data types.

12. The method according to claim 10, wherein the encapsulating comprises:
encapsulating the sequence header, the stream data, and the decoding indication information in the media file of the point cloud media.

13. The method according to claim 10, further comprising:
dividing the media file into a plurality of media segments; and
generating transmission signaling information of the media file based on the plurality of media segments.

14. A data processing apparatus for a point cloud media, comprising:
processing circuitry configured to:
receive a point cloud frame of the point cloud media;
encode the point cloud frame to obtain stream data of the point cloud frame;
generate decoding indication information of the point cloud frame based on the stream data, the decoding indication information of the point cloud frame including at least two attribute headers, and each attribute header including attribute identifier information; and encapsulate the stream data and the decoding indication information in a media file of the point cloud media;

wherein the generation of the decoding indication information comprises:

generating a sequence header based on the stream data, the sequence header indicating a number of groups of data instances of attribute data included in the stream data, the attribute identifier information corresponding to each of the groups of data instances, and an attribute slice data type information corresponding to each of the groups of data instances, and generating the decoding indication information of the point cloud frame based on the sequence header; and the decoding indication information of the point cloud frame includes point cloud slice data, each of the point cloud slice data corresponding to a point cloud attribute slice, and the point cloud attribute slice data including the attribute identifier information.

15. The data processing apparatus according to claim 14, wherein the attribute identifier information indicates one of a plurality of attribute data types.

16. The data processing apparatus according to claim 14, wherein the encapsulating comprises:

encapsulating the sequence header, the stream data, and the decoding indication information in the media file of the point cloud media.

17. The data processing apparatus according to claim 14, wherein the processing circuitry is further configured to:

divide the media file into a plurality of media segments; and generate transmission signaling information of the media file based on the plurality of media segments.

* * * * *